(12) United States Patent
Clancey et al.

(10) Patent No.: US 7,379,908 B2
(45) Date of Patent: May 27, 2008

(54) POPULATING CELLS OF AN ELECTRONIC FINANCIAL STATEMENT

(75) Inventors: William J. Clancey, Portola Valley, CA (US); Lee Hecht, Palo Alto, CA (US); Erich A. Helfert, San Mateo, CA (US); John Wu, Atherton, CA (US); Edgar P. Canty, Menlo Park, CA (US)

(73) Assignee: Modernsoft, Inc., Portola Valley, CA (US)

( * ) Notice: Subject to any disclaimer, the term of this patent is extended or adjusted under 35 U.S.C. 154(b) by 967 days.

(21) Appl. No.: 09/855,684

(22) Filed: May 16, 2001

(65) Prior Publication Data

US 2002/0055952 A1    May 9, 2002

Related U.S. Application Data

(60) Division of application No. 09/114,590, filed on Jul. 13, 1998, now Pat. No. 6,292,811, which is a continuation-in-part of application No. 08/933,584, filed on Sep. 19, 1997, now Pat. No. 6,134,563.

(51) Int. Cl.
    *G06Q 40/00*    (2006.01)
(52) U.S. Cl. .......................................... 705/35; 705/36
(58) Field of Classification Search ............. 705/35–45
    See application file for complete search history.

(56) References Cited

U.S. PATENT DOCUMENTS

| | | | |
|---|---|---|---|
| 3,749,892 A | 7/1973 | Stenning | 705/36 |
| 4,642,767 A | 2/1987 | Lerner | 705/30 |
| 4,989,141 A | 1/1991 | Lyons et al. | 705/36 |
| 5,293,615 A | 3/1994 | Amado | 707/4 |
| 5,359,724 A | 10/1994 | Earle | 707/205 |
| 5,537,590 A | 7/1996 | Amado | 395/600 |
| 5,553,215 A | 9/1996 | Kaethler | 707/503 |
| 5,644,727 A | 7/1997 | Atkins | 395/240 |

(Continued)

OTHER PUBLICATIONS

Benninga, Financial Modeling, 1997, Chapter 1.*

(Continued)

*Primary Examiner*—Richard Weisberger
(74) *Attorney, Agent, or Firm*—Fish & Richardson P.C.

(57) ABSTRACT

A computer-implemented method of populating row and column cells of an electronic financial statement document containing with formulas and data, and related apparatus. A formula for a cell in a financial statement is generated from a row definition for the row and a column definition for the column of the cell, where the row definition defines a term of the statement and the column definition specifies a period of time. The resulting statement is displayed to a user, and new formula expressions can be generated to reflect changes in the statement. The statement can have three kinds of columns, namely base columns, subtotal columns, and grand total columns. Data in columns of an input database corresponds to a database period of time, and the base columns in the statement have statement period unit. For each base column of the statement, a correspondence to more than one column of the input database can be computed dynamically. The cells of the statement column can be populated using data from the corresponding database columns. The cells can be repopulated in response to a change in the statement period unit.

16 Claims, 17 Drawing Sheets

U.S. PATENT DOCUMENTS

| | | | | |
|---|---|---|---|---|
| 5,701,400 | A | 12/1997 | Amado | 395/76 |
| 5,761,508 | A | 6/1998 | Okuno | 707/100 X |
| 5,768,158 | A | 6/1998 | Adler et al. | 716/11 |
| 6,002,865 | A | 12/1999 | Thomsen | 707/3 |
| 6,112,199 | A | 8/2000 | Nelson | 707/4 |
| 6,134,563 | A | 10/2000 | Clancey et al. | 707/503 |
| 6,134,564 | A | 10/2000 | Listou | 707/505 |

OTHER PUBLICATIONS

Spreadware, "Supporting Macintosh Spreadsheets," price list, Graham Communications, Hayward, 1989.
M. Jaynes, "Here Comes SAP," *Fortune*, Oct. 2, 1995, pp. 122-124.
P. Lyons et al., "AI in Business," Workshop Program, AAAI, San Jose Convention Center, Jul. 12-16, 1992.
J. Poultney, "Analytica models business," *MacWeek, News Section*, p. 6 (Sep. 30, 1996).
"Transactions on Information Systems," *acm Press*, vol. 13, No. 1, Jan. 1995.
W. Hamscher, "Model-based reasoning in financial domains," *The Knowledge Engineering Review*, vol. 7:4, 1992, pp. 323-343.
W. Hamscher, "Modeling accounting systems to support multiple tasks: A progress report," Price Waterhouse Technology Centre, Menlo Park, pp. 519-524 (1992).
W. Mossberg, "Excel Spreadsheet Is New and Improved, But Hardly Perfect," article (1995).
Ch. Seiter, "Smart Spreadsheets," *Macworld*, Aug. 1993, p. 77.
Ch. Seiter, "SpreadBase 1.0.1," *Macworld*, May 1993, p. 144.
Special Advertising Supplement, "Better Decisions Mean A Better Bottom Line," CW Custom Publications, Framingham, MA, 10 pgs (Fall 1995).
"Why use CEO*Plan?," Internet information, 14 pgs. (1995).
"Redefining information access, analysis, and reporting for the Macintosh," Business Objects™, 1995, 5 pgs.
J.Keyes, "AI in the Big Six," *AI Expert*, May 1990, pp. 35-42.
C. Brown, "Where 1-2-3 Makes Deals in a Hurry," *Lotus*, Jun. 1989, pp. 52-55.
Lotus, "The Next Lotus spreadsheet is here," Improv Specifications, Cambridge, MA (circa 1991).
M. Falkner, "CFO Advisor Financial Analysis Beyond Spreadsheets," *PC Magazine*, Jun. 27, 1989, pp. 235-243.
"Plan to get ahead in business," Palo Alto Software, 1994, 5 pgs.
"Introducing Cashe," Business Matters, Inc., 1995, 7 pgs.
"Would you bet your future on this number?", DecisioNeering, Inc., product information, 1993.
T. Foulks, "Of Sharks, LANs, and a Crystal Ball," *PC World*, Nov. 1993.
J. Dawson, "Business-Plan Templates," *Macworld*, Jun. 1995, p. 61.
"Make Me An Offer," Business Valuation, price list, Baarns Publishing (1995).
"Go Freel Go Figure," Advertisement, *CompUSA*. (1995).
Advance 1.0 for Windows, Publsihed by Lighten, Website, 8 pgs. (Oct. 5, 1995).
J. Swartz, "New spreadsheet keeps it simple," MacWeek, vol. 10, No. 4 (Jan. 29, 1996).
Stultz, Russell A. Learn Microsoft Office 97 Woodware Publishing Inc. ISBN 1556225407. © 1997.
"XL: AppNote XE0210: Creating and Using tables" (Microsoft Tech Support Document). Original text dated Apr. 1997. Last reviewed Dec. 10, 1999. Found online at support.Microsoft.com.
"XL: Using the Lookup Wizard for Microsoft Excel (Lookup.xla)" (Microsoft Tech Support Document). States that information works back to version 5.0 of Excel. Last reviewed Nov. 3, 1999. Found online at support.Microsoft.com.
"XL97: Natural Language Formulas Return Error" (Microsoft Tech Support Document). Last reviewed Oct. 11, 1999. Found online at support.Microsoft.com.
"About Labels and Names in Formulas" (Printout of Excel 97 help topic).
"Microsoft Announces the Immediate Availability of Office 97" (Press Release). Dated Jan. 16, 1997.
"Microsoft Office 97 Released to Manufacturing" (Press Release). Dated Nov. 19, 1996.
"MS Excel 97 Feature List" (Microsoft TechNet Document). Published Oct. 1996.
Coughlan. Kieren L., and Nolan, Paul J. "Developing Special Purposes Simulations Under Microsoft Windows." Proceedings of the 1995 Winter Simulation Conference (held Dec. 3-6, 1995). ACM. © 1995. pp. 969-976.
Isakowitz, Tomas, Shimon Schocken, Henry C. Lucas. "Toward a Logical/Physical Theory of Spreadsheet Modeling." ACM Transactions of Information Systems, vol. 13, No. 1 Jan. 1995. ACM © 1995. pp. 1-37.
Ronen, Boaz, Michael A. Palley, Henry C. Lucas. "Spreadsheet Analysis and Design" Communications of the ACM, vol. 32, No. 1 Jan. 1989. ACM © 1989. pp. 84-93.

\* cited by examiner

| Statement | Type | Sub-Type |
|---|---|---|
| Income Statement | Sales<br>Costs<br>Income<br>Dividends<br>Change in Retained Earnings | Gross Sales<br>Discounts<br>Allowances<br>Returns<br>Net Sales |
| Balance Sheet Statement | | |
| Funds Flow Statement | | |
| Ratios Statement | | |

| Income Statement ||
|---|---|
| Project | Time Periods |
| Sales Section<br>Gross Sales<br>Discounts<br>Allowances<br>Returns<br>Net Sales | <br><br><br><br><br>= Gross Sales - (Discounts + Allowances + Returns) — 178 — 140 |
| Costs Section<br>Cost of Sales<br>Gross Profit<br>Other Costs<br>Selling General & Admin<br>R&D<br>Interest (Income)<br>Other<br>Interest Expense Section<br>EBIT<br>Net Interest Expense<br>Pretax (Before Extraordinary) | = Cost of Sales Cash - (Depreciation & Amortization)<br>= Net Sales - Cost of Sales<br>— 135<br><br><br>= Short Term Interest Income Rate * Short Term Investments<br><br><br><br>= EBIT - Net Interest Expense |
| Income Section<br>Extraordinary Items<br>Pretax Income<br>Provision for Income Taxes<br>Net Income | <br>= Pretax Income Before Extraordinary - Extraordinary Items<br>= Pretax Income * Tax Rate<br>= Pretax Income - Provision for Income Taxes |
| Dividends Section<br>Preferred Dividends<br>Income Available for Common Dividends<br>Common Dividends Section<br>Common Dividends<br>Common Dividends per Share<br>Primary Earnings per Share<br>Fully Diluted Earnings per Share | <br><br><br><br>= Income Available for Common Dividends * Common Dividends Payout Rate<br>= Common Dividends / Common Shares Outstanding<br>= Income Available for Common Dividends / Common Shares Outstanding<br>= Income Available for Common Dividends / Fully Diluted Common Shares |
| Change in Retained Earnings | = Net Income - (Common Dividends + Preferred Dividends) |

116 — Sales Section
118 — Costs Section
120 — Income Section
122 — Dividends Section
124 — Change in Retained Earnings

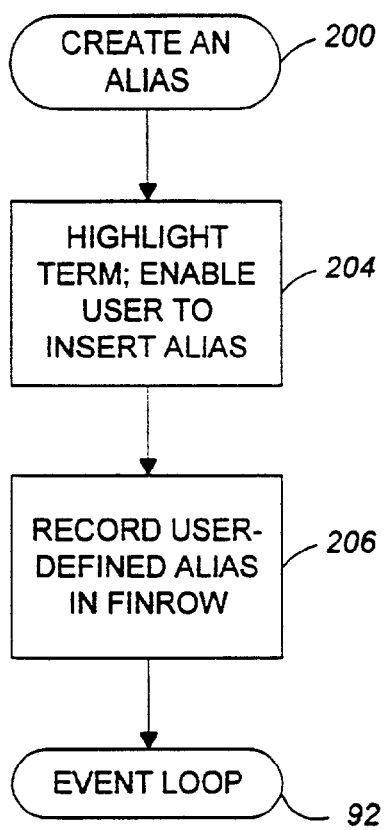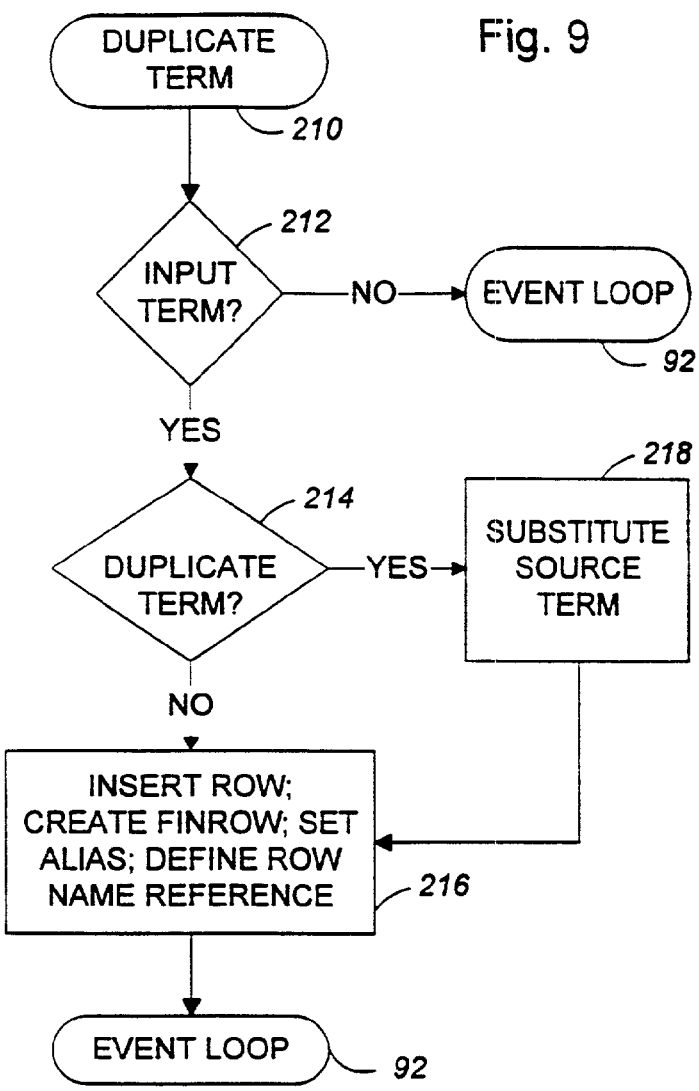

| Project | |
|---|---|
| Input Statement | Time Periods |
| Gross Sales<br>Discounts<br>Allowances<br>Returns<br><br>Cost of Sales Cash<br>Depreciation & Amortization<br>Other Costs<br>Selling General & Admin<br>R&D<br>Short Term Interest Income Rate<br>Short Term Investments<br>EBIT<br>Net Interest Expense<br><br>Extraordinary Items<br>Tax Rate<br>Net Income<br><br>Preferred Dividends<br>Income Available for Common<br>Common Dividends Payout<br>Common Shares Outstanding<br>Fully Diluted Common Shares | 62 |

60 points to the Input Statement column; 300 points to the overall figure.

FIG. 12

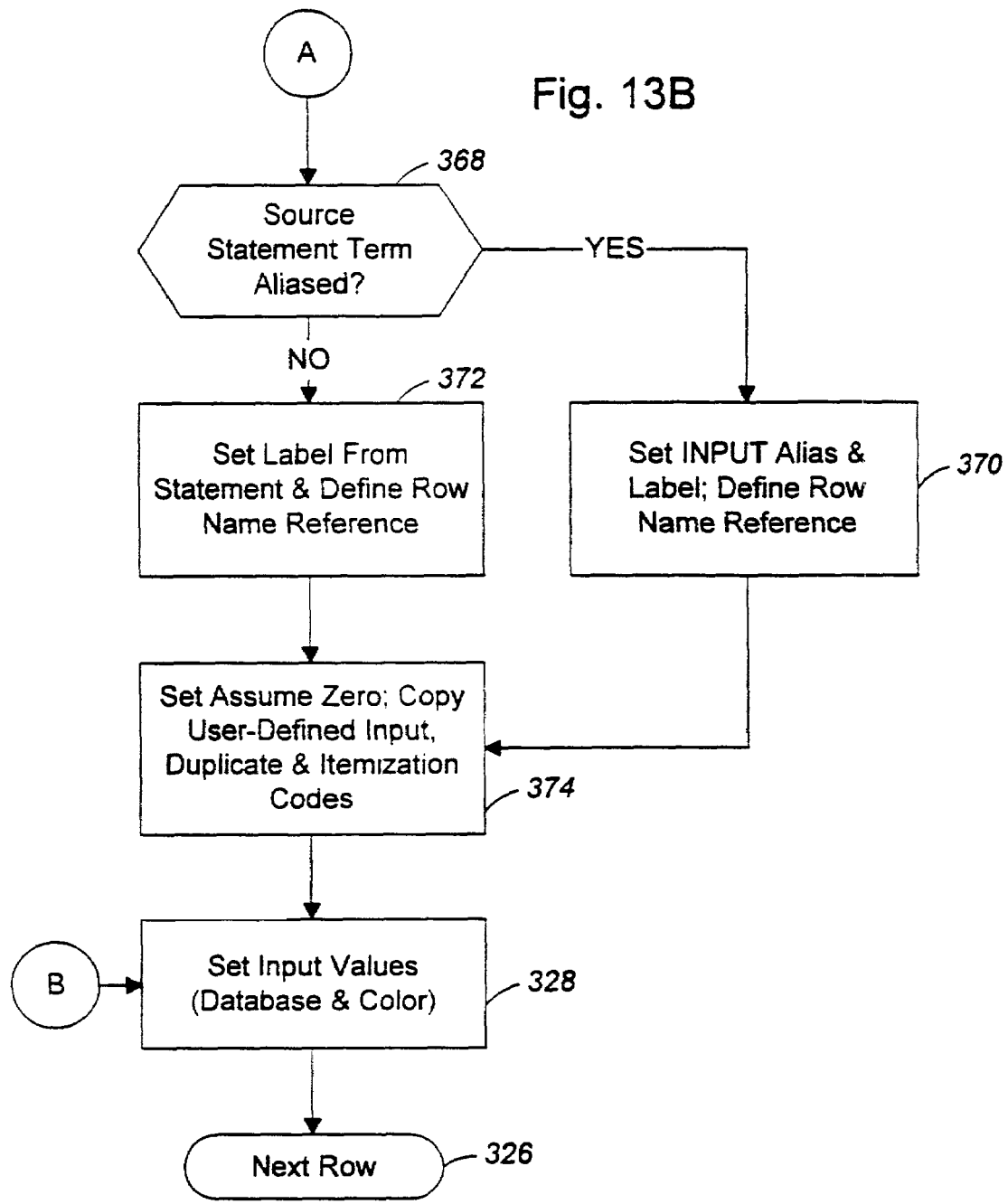

POPULATING CELLS OF AN ELECTRONIC FINANCIAL STATEMENT

CROSS REFERENCE TO RELATED APPLICATIONS

This application is a divisional of U.S. application Ser. No. 09/114,590, entitled "POPULATING CELLS OF AN ELECTRONIC FINANCIAL STATEMENT," filed by William J. Clancey, et al. on Jul. 13, 1998, now U.S. Pat. No. 6,292,811 which is a continuation in part of U.S. application Ser. No. 08/933,584, entitled "CREATING AND EDITING DOCUMENTS," filed by William J. Clancey, et al. on Sep. 19, 1997, now U.S. Pat. No. 6,134,563 which application Ser. No 08/933,584 is incorporated by reference in its entirety.

MICROFICHE APPENDIX

This application includes as Appendix A a microfiche appendix titled Appendix A—Microfiche of Financial Knowledge Base, having 3 fiche with a total of 156 frames.

The foregoing portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The invention relates to creating and editing computer-readable electronic documents, and more particularly to creating and editing domain-specific documents including a report, such as a financial statement.

Reports can be used to summarize, organize, calculate, and analyze data. For example, financial data or sales data can be summarized by one or more financial or sales reports that represent different aspects of the condition or operation of a business entity. To create a financial statement or a sales report, it is often useful to calculate totals, subtotals, averages, counts, or other summaries for different aspects of a business (e.g., total sales for each relevant region, or total sales across regions). Electronic reports are particularly useful because they can be automatically updated when new or different information becomes available. For example, a spreadsheet program such as Microsoft® Excel can be used to create a report in the form of an electronic spreadsheet that consists of a matrix of rows and columns for displaying values and text and for calculating values automatically based upon user-defined formulas. An electronic spreadsheet can also be formatted to vary the presentation of information contained within the report. To simplify the creation of an electronic spreadsheet, a spreadsheet program can automatically enter certain information (e.g., the same information, or an incremental series, such as numerals, ordinals, dates, and months) into a range of cells based upon a user's initial entry of information into one or more cells. A user can also insert a formula into a cell for calculating values on the spreadsheet. Values can be entered directly into a formula, or the values in other cells can be used in a formula by including references to the other cells in the formula. Spreadsheet programs typically include many built-in formulas that can be used alone or in combination with other formulas.

SUMMARY OF THE INVENTION

In general, in one aspect, the invention features a method of generating a formula expression for a cell that is at an intersection of a row and a column in a financial statement. The method includes obtaining a row definition for the row and a column definition for the column, and interpreting the row definition and the column definition to generate a formula expression for the cell. The row definition defines a term of the statement and the column definition specifies a period of time.

Implementations of the invention may include one or more of the following features. The definitions may be interpreted with reference to the position of the cell with respect to other columns in the statement. The formula expression for the cell may be generated on the fly in response to a change in either the row definition or the column definition. The formula expression in each cell of the statement having a formula expression may be evaluated and the resulting statement may be displayed to a user. Data for the formula expressions may be obtained from a database.

A statement base period and a database base period may be provided. The statement base period is the smallest time duration represented in a column of the statement, and the database base period is the smallest time duration represented in a record of the database, the database base period being no greater than the statement base period. The database base period may be detected automatically from column labels read from the database. The statement may be displayed to a user. A command may be received from the user to change a current time period style of the statement to a new time period style, the time period style specifying the period of time covered by the statement and the temporal granularity of the statement. A new formula expression for the cell may be generated according to the new time period style, and the resulting statement may be displayed to the user. A command may be received from the user to use a new database having a new base period that is different from a current base period, a new formula expression for the cell reflecting the new base period may be generated, and the resulting statement may be displayed to the user.

Three kinds of columns may be provided, namely base columns, subtotal columns, and grand total columns. For a row holding a flow term, a subtotal column may have a row value defined as the sum of base column values, and for a row holding a stock term, a subtotal column may have a row value defined as a preceding base column value. A grand total column has a row value defined as the sum of subtotal columns for a row holding a flow term and has a row value defined as a preceding subtotal column for a row holding a stock term. The period columns may be collapsed to show the user a view of the statement consisting of the terms column and total columns. A subtotal time period for a subtotal column may be received from the user, the subtotal time period may be compared to the period of time covered by the statement, and the period of time covered by the statement may be extended to allow computing the subtotal column.

The beginning of the subtotal time period may be compared to the beginning of the period of time covered by the statement, and a row value in the subtotal column may be left blank if the row has a flow term. A command may be accepted from the user to insert a subtotal column or a grand total column in the statement and generate new formula expressions in cells of the statement reflecting this insertion.

In another aspect, the invention is directed to a method of populating a financial statement having columns and rows.

The method includes having columns as a source of input data for the statement. The data in the columns corresponds to a database period unit of time. A statement period unit for the base columns of the statement is identified. The statement period unit is greater than the database period unit. For each base column of the statement, the method dynamically computes a correspondence to more than one column of the input database. The cells of a statement column are populated using data from the corresponding database columns.

The statement may be displayed to a user, the user may change the statement period unit, and the cells may be repopulated in response to a change in the statement period unit. The database base period unit may be detected automatically from column labels read from the database. The statement may be displayed to the user. In response to the user request subtotal columns may be inserted in the statement, and the statement including the subtotal columns may be populated with cell formulas for calculating cell values that include values for the subtotal columns. A row may hold a flow term or a stock term. The cell formula for a row holding a flow term may define a sum of base column values, and a row holding a stock may define a copy of a preceding base column value. A grand total column may be inserted in the statement in response to a user request. Cells of the grand total column may be populated with cell formulas for calculating cell values. For a row holding a flow term, a grand total column may have a cell value defined as the sum of subtotal column values.

In another aspect, the invention is also directed to, and apparatus characterized by, computer programs tangibly stored on a computer-readable media having instructions for causing a processor to carry out the methods of the invention.

The invention may be implemented as one or more computer programs, program modules, and computer-readable data that are stored on computer-readable media and that have instructions for causing a processor to perform the actions described.

Among the advantages of the invention are the following. The tasks of creating and editing documents are simplified by the separation of the presentation of information contained in a document from underlying representation of calculations and interrelationships. A user may define and customize standard reports with a simple palette of powerful editing tools that implement and maintain the semantics of the items in a document. This frees the user from having to handle the underlying references directly, allowing the user to focus instead upon concepts and contexts contained within the document. The invention provides for a component library of standard financial concepts and definitions, including definitions of financial statements, terms, formulas, and projection operation; for immediate interactive redefinition of column time period attributes; and for immediate interactive redefinition of periodic subtotals and grand totals. This allows users to manipulate the content and appearance of financial analyses without repeatedly having to define and verify calculations. An input document, such as an input spreadsheet, on which input terms are collected provides a highly-useful perspective from which a user may view the data obtained from a database and perform what-if analyses. Use of an input document simplifies creation and maintenance of a report using information from a database. An input document also provides a user-friendly interface with one more data warehouses. The invention provides the ability to create database templates customized for particular database vendors, financial data suppliers, or according to company-specific formats; such templates link a user's database to the user's dictionary of terms and hence to the financial statement generator.

Other features and advantages will become apparent from the following description, including the claims.

BRIEF DESCRIPTION OF THE DRAWINGS

FIG. 3C is a diagrammatic view of a three-pane browser for viewing terms defined in a financial dictionary.

FIG. 4 is a diagrammatic view of the section headings and associated terms appearing in an income statement.

FIG. 8 is a flow diagram of a method of creating an alias for a term appearing in a financial statement.

FIG. 9 is a flow diagram of a method of duplicating a row in a financial statement.

FIG. 12 is a diagrammatic view of an input statement for the income statement of FIG. 4.

FIGS. 13A and 13B are flow diagrams of a method of copying input terms from a financial statement into an input statement.

DETAILED DESCRIPTION

Figure 1:
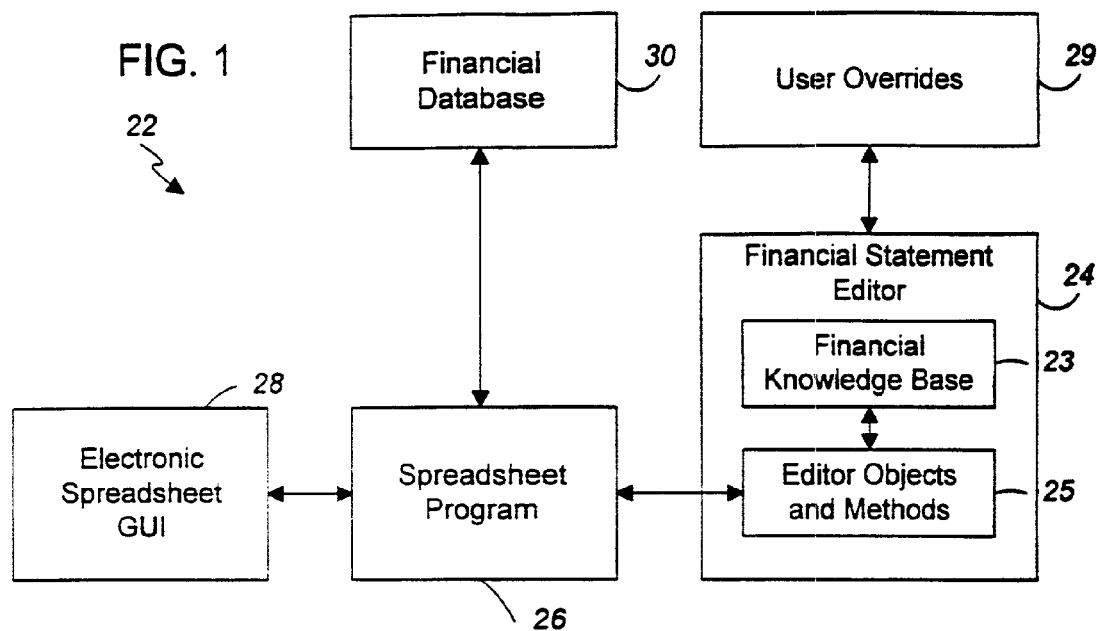
FIG. 1 is a block diagram of a system for creating and editing a financial statement.

Referring to FIG. 1, a system 22 for creating and editing a financial statement report is implemented as a group of computer programs, program modules, and computer-readable data that are stored on computer-readable media and that operate to cause a computer to perform the actions described in this specification. System 22 includes a financial statement editor 24 that has a financial knowledge base 23 and editor objects and methods 25. The financial knowledge base 23 includes a financial dictionary of terms representing financial concepts with predefined properties and interrelationships. The editor objects and methods 25 control the operation of an electronic spreadsheet program 26 in response to user actions directed to the editor objects and methods 25 through a user interface 28, such as a graphical user interface operated under control of system 22. Statement editor 24 embodies and manifests a general financial model of possible contexts, parameters and values, as well as hierarchies and rules relating them. A user may provide overrides 29 to change one or more aspects of financial statement editor 24. In operation, system 22 separates the presentation of financial data and analyses from the underlying data and numeric calculations. Using system 22, a user indicates the financial model elements to be contained within a financial statement. In response, system 22 manages the conceptual and numeric relationships among the selected elements, indicates what information is needed to produce the statement—which information may be entered by hand or acquired under program control from computer-readable source such as a financial database 30—and ensures that this information is used and calculated consistently within one or more financial statements. Information in database 30 can be stored in the form of an electronic spreadsheet, a relational database, or some other electronic form.

In the particular embodiment being described, system 22 is implemented as a computer program running on a personal computer. Spreadsheet program 26 is the Microsoft® Office 97 version of Excel ("Excel"). Financial statement editor 24 is implemented as an add-in to Excel and includes an object-oriented program module that is written in the Microsoft® Visual Basic® for Applications programming language (version 5.0). In particular, financial statement editor 24 includes a financial knowledge base 23; maintenance routines for verifying and organizing financial knowledge base 23; and editing objects and methods 25. The financial knowledge base 23 includes definitions of financial terms representing financial concepts. Editing objects and methods 25 set up menus and tool bars, open and manipulate a project workbook, provide dialogue sheets, provide a browser for displaying the contents of financial knowledge base 23, represent the contents of one or more financial statements, and carry out editing functions. In this particular implementation, editor objects and methods 25 invoke Excel objects and methods. Editor objects and methods 25 also access financial knowledge base 23 to provide editing menus and editing tools. Editor objects and methods 25 may be invoked when a user applies one of the editing tools, as described below. In this embodiment, financial database 30 is in the form of an electronic Excel spreadsheet. User interface 28 provides an Excel spreadsheet and other user interface elements that are displayed on a computer display device (such as a monitor or liquid crystal display screen). User interface 28 responds to user actions such as typing keys on a computer keyboard, moving a mouse or other pointing device to move a cursor across the computer display, or activating a computer mouse button. System 22 stores in computer memory a project workbook representing a financial project. A project workbook contains one or more financial statements, an input statement (which in the implementation being described is a financial statement spreadsheet used for collect input values), a hidden status spreadsheet, saved objects corresponding to financial statements, and macros for initializing links to spreadsheet program 26 and for saving the financial statement objects when the corresponding Excel spreadsheets are opened and closed.

Figure 2:
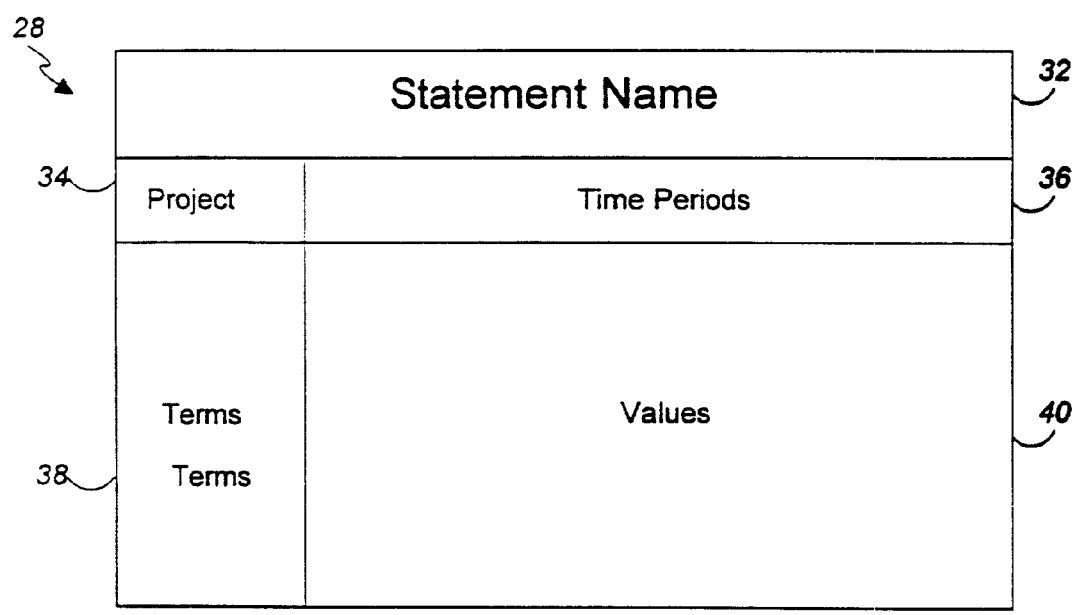
FIG. 2 is a diagrammatic view of a financial statement as displayed to a user.

As shown in FIG. 2, user interface 28 displays a mockup financial statement. The financial statement spreadsheet is referred to as a "mockup" because it is being created and edited. The mockup shows the current appearance of the financial statement so that a user can readily see how an editing operation changes the appearance of the financial statement. User interface 28 shows a statement name area 32 that identifies the kind of statement being represented a project name area 34 that identifies the name of the project in which the financial statement is contained, a time periods area 36 that identifies the time periods covered by the financial statement, a user-modifiable terms area 38 that represents financial concepts contained within the financial statement, and a values area 40 that can be automatically populated with spreadsheet formulas and/or values corresponding to the associated financial terms. The values in values area 40 are copied from an input statement (described below) which obtains values from the user, from database 30, or from both of these sources. Financial statement editor 24 prevents a user from editing cells within values area 40 that are automatically populated with spreadsheet formulas and/or values. A user can, however, create additional rows and columns that can incorporate calculations and data contained within other spreadsheet cells.

Figure 2A:
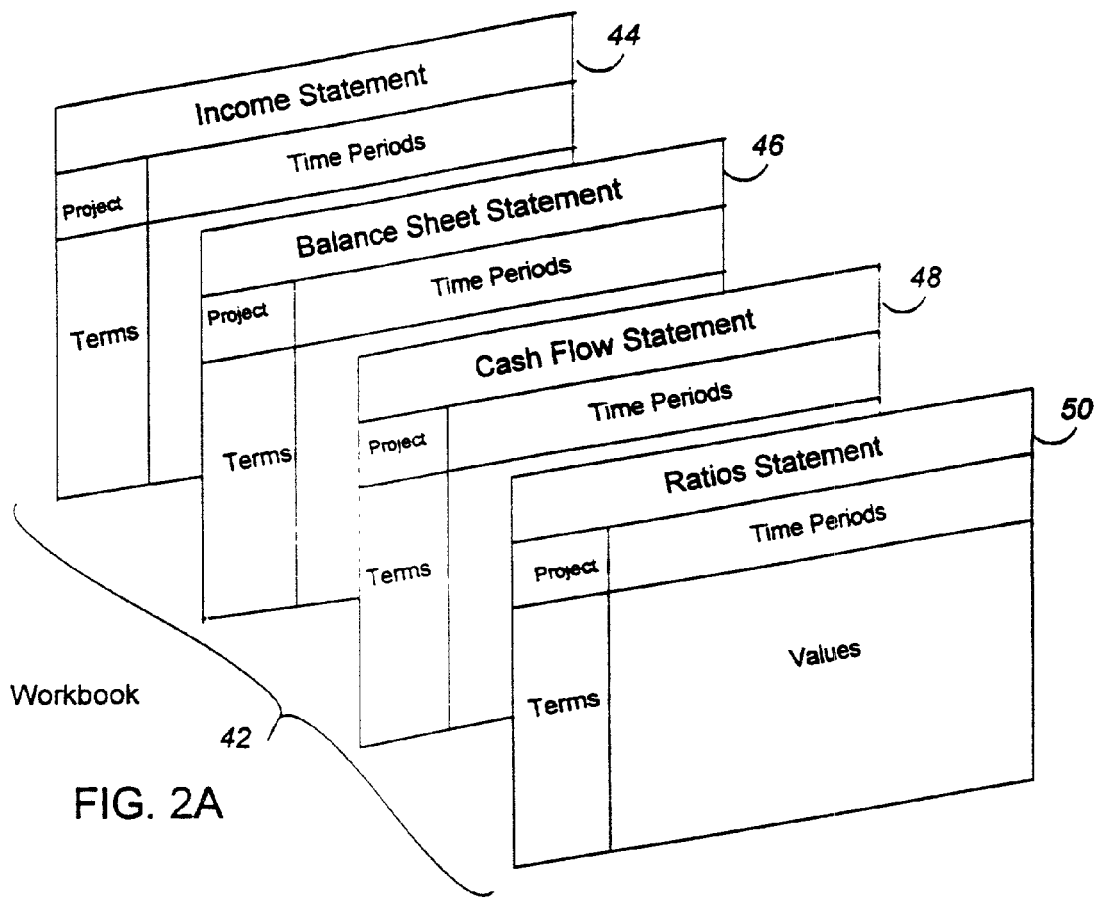
FIG. 2A is a diagrammatic view of an example of a financial workbook, which includes an income statement, a balance sheet statement, a cash flow statement, and a ratio statement.
Figure 2B:
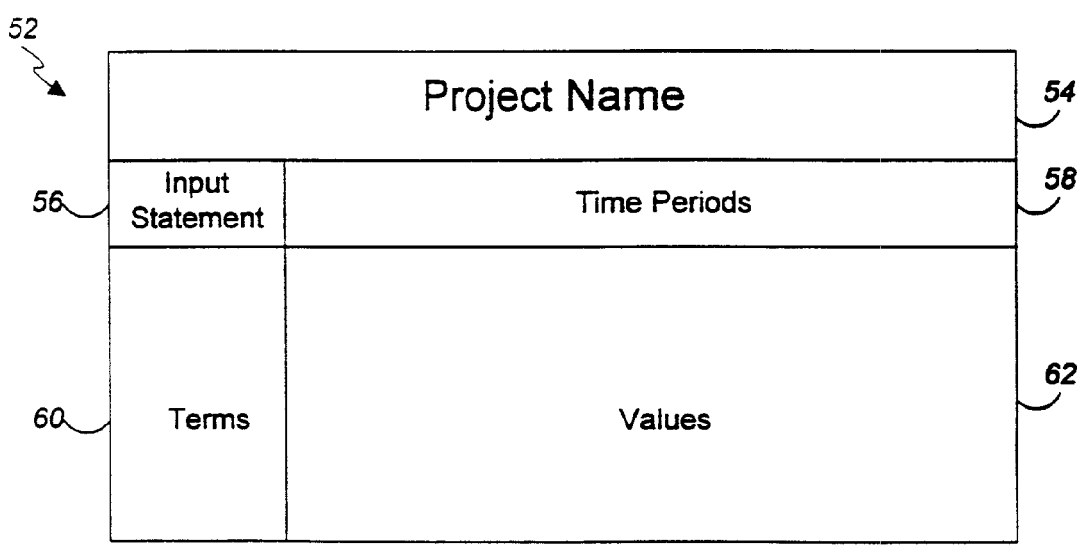
FIG. 2B is a diagrammatic view of an input statement for the financial workbook of FIG. 2A.

Referring to FIGS. 2A and 2B, a computer-readable project workbook 42 includes one or more user-specified financial statements, such as an income statement 44, a balance sheet statement 46, a cash flow statement 48, and a ratio statement 50, each representing a different aspect of a financial project over the selected time range. Project workbook 42 may also include a customized financial statement containing one or more user-selected financial sections and terms. After a user has specified the contents of any of the financial statements in workbook 42, system 22 automatically generates an input statement 52, also called an input sheet, which identifies all of the information (inputs) needed to populate the financial statements with formulas and values. Input statement 52 includes a project name area 54, an area 56 that identifies the statement as an input statement, an area 58 that contains the time periods covered by the financial statements of project workbook 42, a terms area 60, and an inputs (values) area 62. Some of the terms contained in terms area 60 may not be displayed in any of the financial statements but are needed to calculate the values associated with the terms that actually appear on one or more of the financial statements in workbook 42. Input statement 52 contains only those inputs (and associated terms) needed to populate the financial statements of workbook 42; any input that is not needed is automatically removed from input statement 52 when the input statement is updated. Input values appearing on input statement 52 are color-coded to identify the source or other properties of the input values: values copied from database 30 are displayed in blue, user-supplied values that override database values are displayed in magenta, and user-supplied values that do not override database values are displayed in green.

Figure 3:
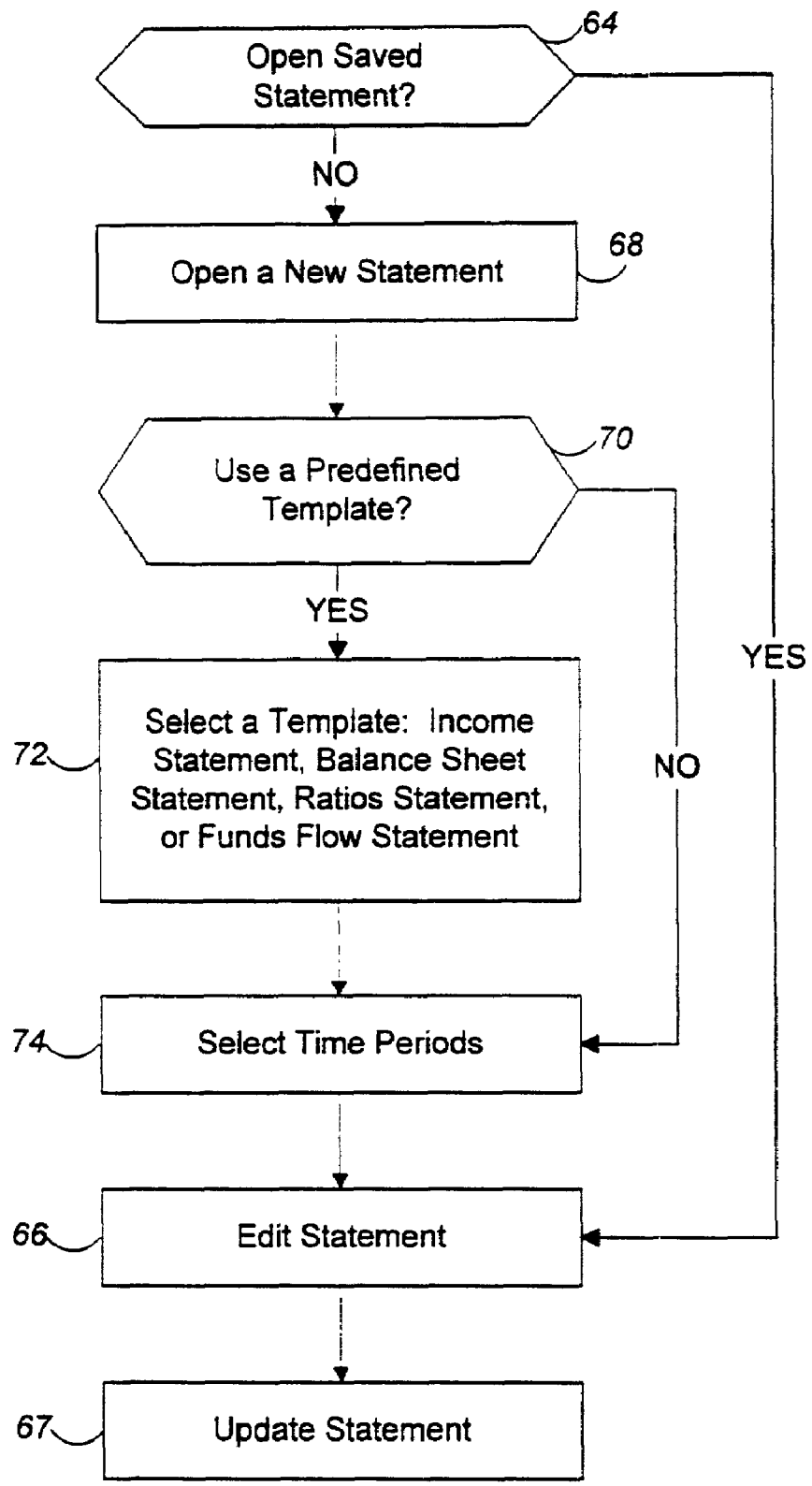
FIG. 3 is a flow diagram of a method by which a user operates the system of FIG. 1 to create and edit a financial statement.

Referring to FIG. 3, a user may open a previously-created project workbook that was saved in a computer memory such as a disk (step 64). The user may then edit the one or more statements in the project, as described in detail below (step 66). Alternatively, a user may create a new project (step 68). The user may then create a new statement based upon a financial statement template containing financial concepts arranged in a predefined format, or the user may open an empty statement (step 70). For example, the user may select a template for an income statement, a balance sheet statement, a ratio statement, or a cash flow statement (step 72). After selecting a template, the user may specify the time range and time periods to be displayed in the financial statement (step 74). The time periods of the mockup financial statement are represented as a finTime_Styles object in financial statement editor 24. The user may then edit the financial statement with one or more financial statement editing tools (step 66). If the user does not select a financial statement template, the user may create a customized financial statement by specifying the time range and time periods to be displayed in the financial statement (step 74) and by creating and editing the financial statement with one or more financial statement editing tools (step 66). The user may insert financial terms in the terms area of the mockup financial statement one at a time, or the user may insert an entire financial section into the mockup financial statement. In order to populate the mockup financial statement with data, the user selects an UPDATE editing tool (described below) or selects the spreadsheet tab which corresponds to the input statement at the bottom of the project workbook interface window (step 67). System 22 creates (or updates) input statement 52 with all of the required input terms, populates input statement 52 with data from financial database 30 (if supplied), and inserts formulas that refer to this data in the mockup financial statement. The database is handled by a Visual Basic module that to the financial statement editor 24 has the appearance of an object.

Figures 3A, 3B:
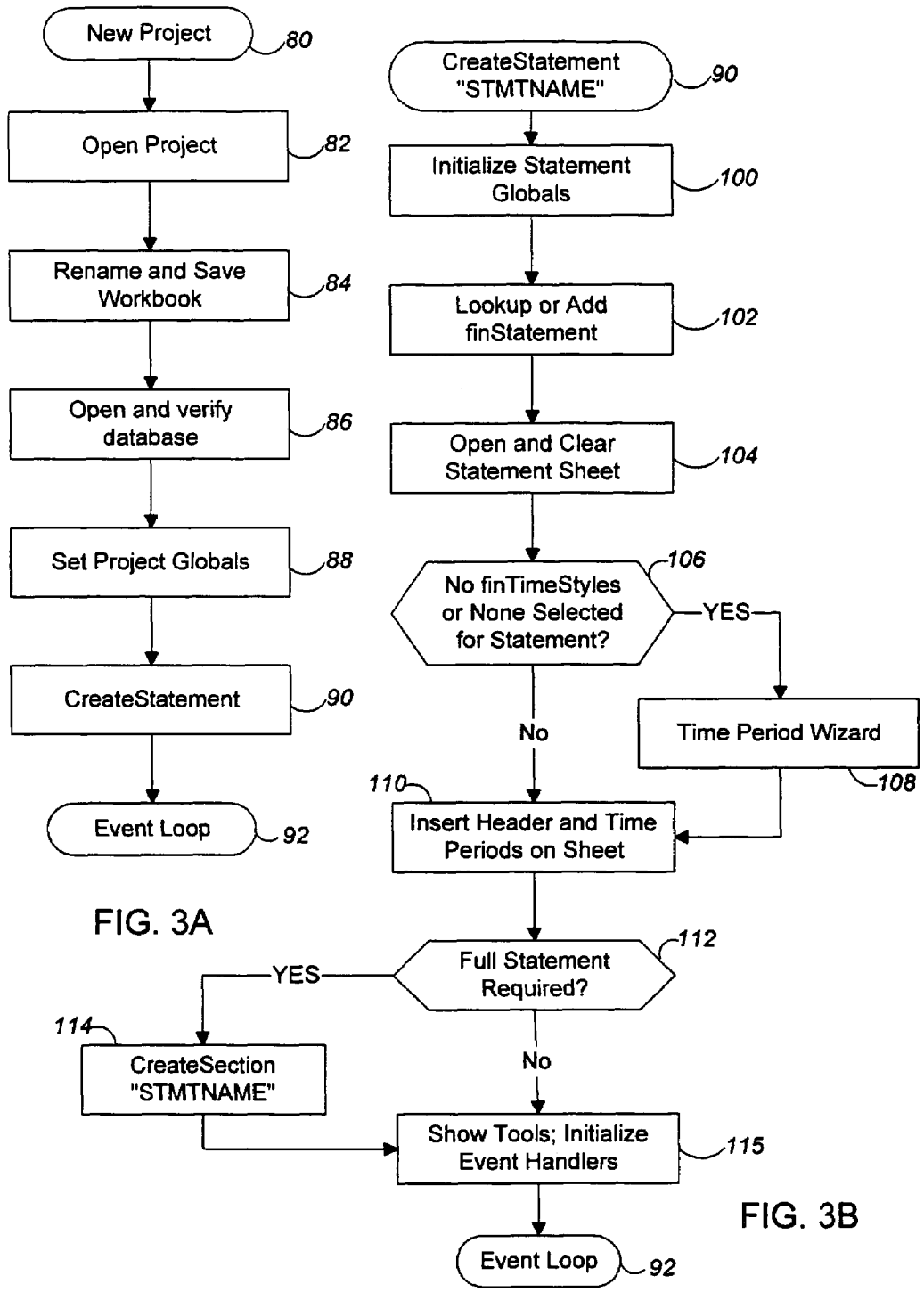
FIG. 3A is a flow diagram of an initialization method used in creating and editing a financial statement.
FIG. 3B is a flow diagram of a method of creating a new financial statement.

Referring to FIG. 3A, in response to a user's command to create a new financial statement or project (step 68; FIG. 3), system 22 initiates a new project as follows (step 80). System 22 opens a template project workbook that contains one or more Excel spreadsheets (step 82). System 22 renames and saves the workbook in a memory device, such as a computer hard disk (step 84). System 22 opens and verifies the format of financial database 30 (step 86), the identity of which is a property of the project. System 22 sets the globals for the project (step 88). System 22 then creates a new financial statement (step 90). Once the financial statement has been created, system 22 returns control to an event loop and responds to subsequent user actions (step 92). The methods and data related to a project are implemented in a Visual Basic module that has the appearance of an object.

Referring to FIGS. 3B and 3C, after a user has directed system 22 to create a statement, the user is prompted to supply the name of the statement ("STMTNAME"). System 22 then initializes statement globals (step 100). If the requested statement name corresponds to a previously saved statement, system 22 obtains from the project workbook an object (of type finStatement) which contains all of the information needed to reproduce the saved mockup financial statement (spreadsheet) and enable a user to modify the statement with the financial statement editing tools of system 22; otherwise, system 22 creates a new object (of type finStatement) for a new mockup financial statement (step 102). System 22 then opens and clears the mockup financial statement (step 104). If the time periods to be displayed in the financial statement have not been specified (step 106), system 22 invokes a time period wizard to prompt the user to supply the time periods to be displayed in the financial statement (step 108).

Figure 6:
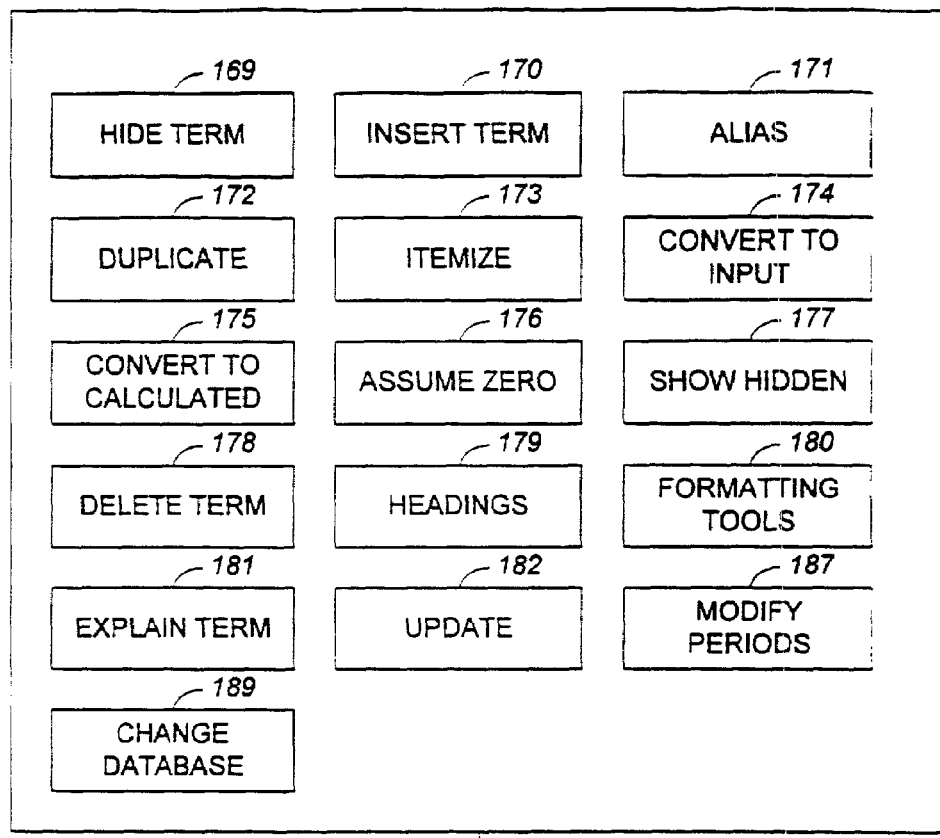
FIG. 6 is a diagrammatic view of a menu of financial statement editing tools.

The time period wizard creates a sequence of time period labels in a scratch sheet in the project workbook corresponding to the time style (defined by finTime_Styles)—a sequence of dates starting the start date and running through the end date, with a duration of the base period unit. If there are any totals columns (subtotals, or subtotals and grand total) the ends of totals periods are defined as follows: the end of a Year is December or Quarter 4 or last week or 365; the end of a Quarter is March, June, September, or December, or last week in quarter, or last day in quarter; the end of a Month is last week in month or last day in month; and the end of a Week is Saturday (last day in week). A total is inserted after the date that is the last in the total's period. Total columns are described later, particularly in reference to the MODIFY PERIODS editing tool 187 (FIG. 6).

System 22 enters a header (namely, the statement name and project name) and the specified time periods into the mockup financial statement, as shown in FIG. 2 (step 110). System 22 displays on the computer display device a three-pane financial browser 111 (FIG. 3C). The user can interact with the browser to insert into a mockup financial statement a full financial statement, a full financial statement section, or an individual financial term. The full financial statement may be selected from a list shown in the left pane of the browser, which list may include an income statement, a balance sheet statement, a cash flow statement, or a ratio statement. A full financial statement section may be selected from a list shown in the center pane of the browser as a type of a selected full statement. An individual financial term may be selected from a list shown in the right pane of the browser as a subtype of a selected section type. A financial term may be, for example, a ratio expression, a total expression, a net expression, another compound expression, or an arithmetic expression of a specified type, such as sales, costs, income, dividends, change in retained earnings, and other types. In effect, financial browser 111 provides a three-pane hierarchical display that shows subtypes and subparts of the conceptual graph of properties stored as a table in a KBProps spreadsheet, which is described later. If the user selects a predefined, full financial statement (step 112), system 22 automatically populates the mockup financial statement with the section headings and financial terms for the selected statement according to its definition (step 114). System 22 displays a palette or menu of spreadsheet editing tools, initializes event handlers, unlocks the first column of the mockup financial statement (corresponding to financial terms area 38 in FIG. 2), and protects the mockup financial statement so that a user cannot directly edit name area 32, project name area 34, time periods area 36, or values area 40 (step 115). These areas may later be edited when the user applies to a selected area one or more of the editing tools described below. System 22 then returns control to the event loop and responds to subsequent user actions (step 92).

A financial statement generally has one or more financial sections, each having one or more associated financial terms. For example, income statement 44, shown in FIG. 4, was created based on a predefined income statement template in financial statement editor 24, and includes a sales section 116, a costs section 118, an income section 120, a dividends section 122, and a change in retained earnings section 124. Each of these sections includes one or more financial terms. For example, sales section 116 includes a gross sales term 126, a discounts term 128, an allowances term 130, a returns term 132, and a net sales term 134. Each term is characterized as either an input term or a calculated term. Input terms (e.g., gross sales term 126) have values that are obtained from financial database 30 or are input directly by a user. Calculated terms (e.g., net sales term 134) have values that are derived from spreadsheet formulas. For example, net sales term 134 has a value that is derived from the following spreadsheet formula:

net sales=gross sales−(discounts+allowances+returns).

The value associated with net sales term 134 therefore depends upon the values for gross sales term 126, discounts term 128, allowances term 130, and returns term 132, each of which will be referred to as a "'direct predecessor" of net sales term 134. Gross profit term 136 has a value that is derived from a spreadsheet formula 135 that includes two direct predecessors which are calculated terms (net sales and cost of sales); the terms from which values are obtained for direct predecessor calculated terms (e.g., net sales and cost of sales) will be referred to simply as "predecessors" of the original calculated term (e.g., gross profit term 136). Thus, net sales term 134 and cost of sales term 137 are direct predecessors of gross profit term 136. Gross sales term 126, discounts term 128, allowances term 130, returns term 132, cost of sales cash term 138 and depreciation & amortization term 140 are predecessors of gross profit term 136. Conversely, net sales term 134 is a "direct dependent" of gross sales term 126, discounts term 128, allowances term 130, and returns term 132.

Financial knowledge base 23 is stored as a matrix of terms and associated relations, which define a conceptual graph. This matrix is conveniently stored in an electronic spreadsheet called KBProps (reproduced in the attached Appendix) that is accessed by finObjects modules routines. Each term (referred to as a KBATOM) in financial knowledge base 23 is characterized by the following relations: ISA, PNAME, PARTOF, SUBPARTS, PREDEFINEDALIASES, ACTUALFORMULA, STOCKFLOW, UNITS, SECTIONHEADER, SECTIONFORMAT, NAMEFORMAT, LINEFORMAT, and INFORMULA. The properties PARTOF and INFORMULA are calculated by a dictionary maintenance program, and for that reason are not shown in the attached appendix. For example, net sales term 134 is characterized as follows:

| Definition of Net Sales Term | |
|---|---|
| KBATOM | Net_Sales |
| ISA | Net_Expression |
| PNAME | Net Sales |
| PARTOF | SALES_SECTION MARGIN_ANALYSIS |
| PREDEFINEDALIASES | "Revenue" |
| | "Revenues" |
| | "Sales-Net" |
| | "Net Revenues" |
| ACTUALFORMULA | Gross_Sales - (Discounts + Allowances + Returns) |
| STOCKFLOW | Flow |
| NAMEFORMAT | (Income_statement grayshade) |
| LINEFORMAT | (income_statement skipafter) |
| INFORMULA | Contribution_Margin |
| | Gross_Profit |
| | Net_Sales_Cash |
| | Sales_Growth_Percent |
| | Contribution_Margin_Percent |
| | Gross_Margin_Percent |
| | SG_and_A_Percent_Of_Sales |
| | R_and_D_Percent_of_Sales |
| | Operating_Income_Margin_Percent |
| | Return_on_Sales |

Figure 5:
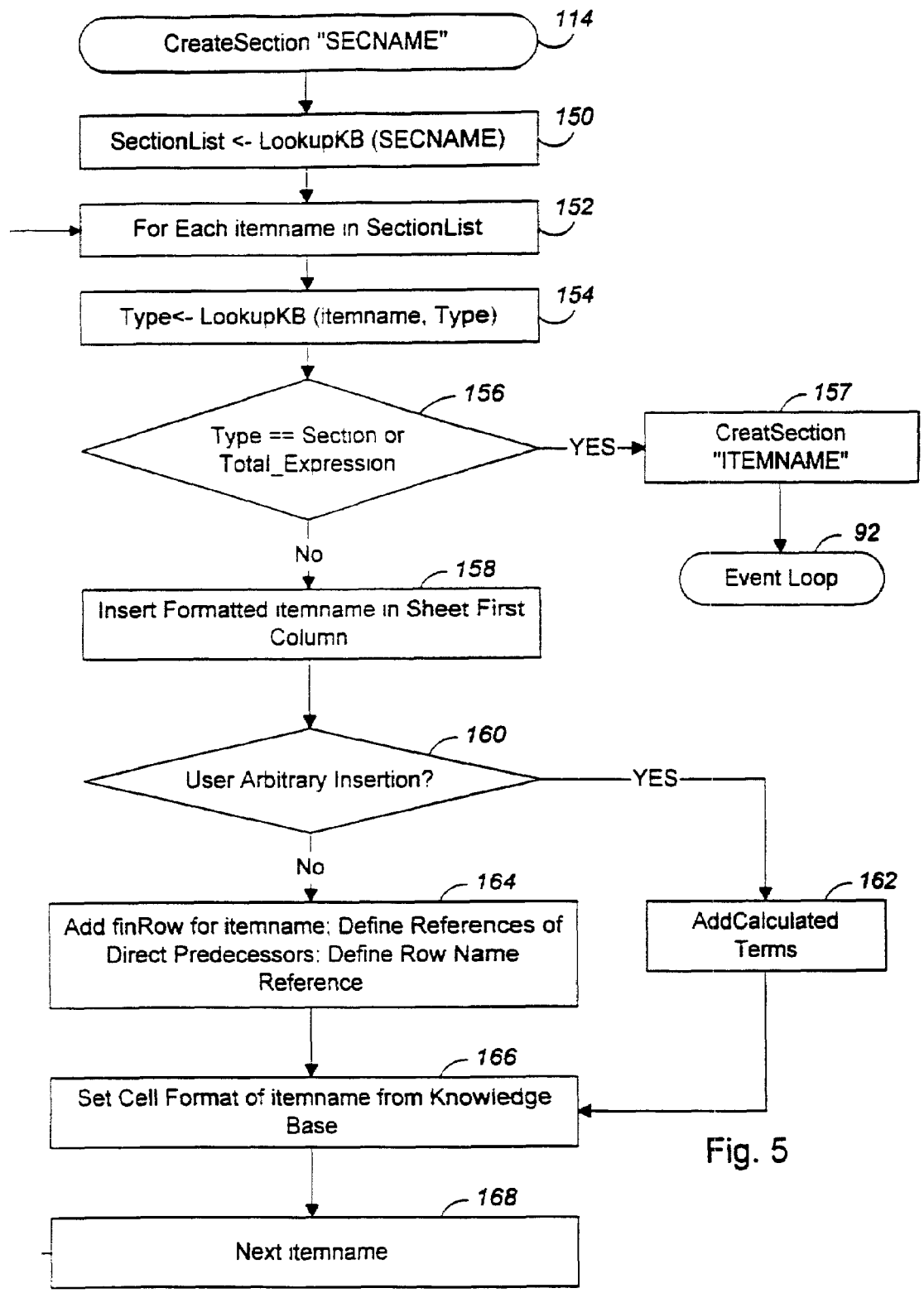
FIG. 5 is a flow diagram of a method of creating a section in a financial statement.

Referring to FIG. 5, system 22 automatically populates the mockup financial statement (FIG. 2) with financial terms corresponding to a financial statement heading (called a SecName in KBProps) as follows (step 114). System 22 invokes a lookupKB module to obtain from financial knowledge base 23 a SectionList, which is a list of one or more financial terms to enter into terms column 38 based upon the SecName (step 150). For each term (called an itemname) in the SectionList, system 22 performs the following steps (step 152). System 22 determines the type of the term from the ISA relation for the term (step 154). If the term is a section or a total expression (step 156), system 22 recursively invokes step 114 to create a section or a total expression associated with the term (step 157); otherwise, system 22 adds the term to terms column 38 (SheetFirstColumn) of the mockup financial statement spreadsheet (step 158). If the term was added by the user (step 160), system 22 automatically populates terms section 38 with any calculated terms used by the spreadsheet formula associated with the user-added term (step 162); otherwise, system 22 stores the properties of the term as a finRow object in an electronic spreadsheet that corresponds to a finStatement object (discussed in the following section). The finRow object includes references of direct predecessors and a row name reference (step 164). System 22 sets the format for the cell in which the term was added based on a predefined or default format specified to financial statement editor 24 (step 166). System 22 then returns to step 122 for the next itemname in the SectionList and repeats the above process (step 168).

Internal Data Structures

As mentioned above, a mockup financial statement is represented to a user as an electronic spreadsheet on a computer display device. System 22 also maintains an internal parallel representation of the financial statement in the form of a finStatement object that includes a finRows object and a finColumns object which respectively correspond to the terms and time periods in the mockup financial statement. A finStatement object has the following properties.

| finStatement Properties | Type | Description |
|---|---|---|
| Name | String | Name of spreadsheet where statement appears |
| finRows() | finRow | |
| numRows | Integer | Number of rows in this statement |
| finColumns() | finColumn | |
| numColumns | Integer | Number of columns in this statement |
| IsINPUTSheet | Boolean | True if this is the input sheet |
| TimePeriodRange | Range | Row corresponding to the time period labels |
| TimeStyleSelected | Integer | Index of selected time style for this statement |

A finStatement object for an input sheet has the following additional properties:

| Additional finStatement Properties | Type | Description |
|---|---|---|
| Formatted | Boolean | Input sheet has been set up with headers and labels |
| DataRequired | Boolean | Blanks exist in the data area |

A finRows object has the following properties:

| finRow Properties | Type | Description |
|---|---|---|
| Name | String | Built-in financial term in knowledge base |
| Alias | String | User's name for this term |

-continued

| finRow Properties | Type | Description |
| --- | --- | --- |
| ChangedStyle | Boolean | User changed the dictionary-defined formatting style of the name or the line |
| DuplicateOf | String | Existing term user duplicated to create this row |
| NumDuplicates | Integer | Number of duplicates user has created of this existing term |
| DuplicateCode | Integer | Unique identifier for this duplicate |
| ItemizationOf | String | User has itemized this existing term |
| ItemizationCode | String | Unique identifier for this itemization |
| NumItemizations | Integer | Number of itemizations user has created of this term |
| Hidden | Boolean | This row is currently hidden in the currently displayed statement |
| UserDefinedInput | Boolean | User converted this to an input (by editing mockup financial statement) |
| AssumeZero | Boolean | User wants to assume values are zero |
| DependentMadeInput | Boolean | User made parent an input and hid this predecessor |
| HistDataSource | Integer | Source of historical data (e.g., user database) |
| HeaderOf | String | This row is a header for the indicated section |
| Calculated | Boolean | Term is calculated (not an input) according to dictionary definition |
| Format | Integer | Current style of name (e.g., bold, italic) and line shading, spacing |
| Parent | String | finStatement name |
| directPredecessors() | String | Terms directly referenced in this item's formulas |
| NumDirectPredecessors | Integer | Number of direct predecessors |
| DirectDependents() | String | Terms using this term in a formula |
| NumDirectDependents | Integer | Number of direct dependents |
| RefersTo | Variant | Entire row in spreadsheet (an Excel range object) |
| NumSecondaryRefs | Integer | Number of times this term has been cloned |
| SecondaryReferenceOf | Range | Term this is a clone of |
| UserDefinedRow | Boolean | Entire row is set by user (ignored by financial statement editor) |
| PriorYrHistory | String | Value = X for term having X_Prior in its formulas |

A finRow object for an input statement includes all of the above properties, along with the following additional properties.

| Additional Input finRow Properties | Value | Description |
| --- | --- | --- |
| InputforStmts() | Integer | finStatement numbers for which this row is an input |
| NumInputStmts | Integer | Number of statements for which this row is an input |
| ExclusivelyOneFstmt | Boolean | Row is only an input for the statement being processed |

A finColumn object has the following properties.

| finColumn Properties | Type | Description |
| --- | --- | --- |
| Name | String | Defined name of the column |
| Time | Date | Actual date corresponding to label in spreadsheet |
| Parent | String | finStatement name |
| ColumnNumber | Integer | Number of column in spreadsheet |
| LabelCell | Range | Cell corresponding to the time label |
| PeriodKind | String | Period of Time (e.g., year, month) |

-continued

| finColumn Properties | Type | Description |
| --- | --- | --- |
| Refers to | Variant | Entire column in spreadsheet |
| TotalStartColumn | Integer | Spreadsheet column that is first in sequence for computing total |
| TotalEndColumn | Integer | Input column that is last in sequence for base period of statement (when base periods are totals) |
| TotalType | String | "", "SubTotal", or "GrandTotal" |
| IncompleteTotal | Boolean | Too few preceding columns to calculate this total |

A finTime_Styles object has the following properties.

| finTime_Styles Property | Type | Description |
| --- | --- | --- |
| Name | String | Name user has defined for this view |
| BaseDate | Date | Date to use for "this period" (generally last year) |
| BeginDate | Date | Beginning date of period (may be historical) |
| EndDate | Date | Ending date of period |
| Periodunit | String | Duration of one period (e.g., year) |
| numPeriods | Integer | Number of period labels in the range |
| BasePeriodsAreTotals | Boolean | Period unit is greater than database unit and therefore base columns are totals |
| NumInputPeriods | Integer | Number of period labels generated for input spreadsheet |
| ActuallyWroteTotals | Boolean | Total labels were included (property is ignored if duration is too short) |
| SubTotalUnit | String | Period unit of subtotals; non-blank causes subtotal columns to be computed and shown |
| GrandTotalUnit | String | Period unit of grand totals; non-blank causes grand total columns to be computed and shown |
| InvalidRange | Boolean | Indicates that defined time style has invalid dates |
| DBInconsistent | Boolean | Previous style is inconsistent with new database |

The database module has the following properties.

| Database Object Properties | Type | Description |
| --- | --- | --- |
| Exists | Boolean | True if database is linked to this project |
| PeriodUnit | String | Period unit represented by columns of this database |

Financial Statement Editing Tools

Referring to FIG. 6, system 22 includes a menu 167 of financial statement editing tools which allow the user to edit a mockup financial statement. A user can insert a term from statement editor 24 into the financial statement by selecting an INSERT TERM editing tool 170. A user can create an alias for a term by selecting an ALIAS editing tool 171 to change the displayed name of a term. System 22 maintains the integrity of the financial statement by preserving the original meaning of the term as specified in financial statement editor 24.

A user can duplicate a term by selecting a DUPLICATE editing tool 172. This breaks up a single input term into two separate input terms. System 22 maintains the integrity of the financial statement by replacing each instance of the original input term in a spreadsheet formula with the sum of the two new input terms.

A user can itemize a term by selecting an ITEMIZE editing tool 173. This breaks up a term into one or more subitems. System 22 inserts into the financial statement a new total term whose value is the sum of the subitems.

A user can convert a calculated term into an input term by selecting a CONVERT TO INPUT editing tool 174, which obtains the term's value from financial database 30 or directly from the user. A user can also can re-convert a converted input term back to a calculated term by selecting a CONVERT TO CALCULATED editing tool 175. A user can direct system 22 to convert a calculated term to an input term and set the term's value to zero when populating the mockup financial statement with values by selecting an ASSUME ZERO editing tool 176.

A user can hide a term by selecting a HIDE TERM editing tool 169. A user can direct system 22 to show hidden terms (e.g., hidden predecessors of a calculated term that are automatically added to the mockup financial statement by system 22) by selecting a SHOW HIDDEN editing tool 177. A user can delete a term by selecting a DELETE TERM editing tool 178.

A user can toggle headings so that the user can see the grids and conventional alphanumeric headers for the matrix of rows and columns by selecting a HEADINGS editing tool 179. A user can change the format of the mockup financial statement, for example, by changing the appearance (style) of a row or by moving a row to a different location by selecting one or more FORMATTING TOOLS 180.

A user can also direct system 22 to report the properties of a term by selecting an EXPLAIN TERM tool 181.

Once a mockup financial statement has been created, a user can direct system 22 to create (or update) an input statement and populate the mockup financial statement with data and spreadsheet equations by selecting an UPDATE editing tool 182.

A user can also direct system 22 to modify the time periods shown in a time periods area 36 (FIG. 2) by selecting a MODIFY PERIODS editing tool 187.

A user can also direct system 22 to change the selected database 30 (FIG. 1) by selecting a CHANGE DATABASE editing tool 189.

Insert Term. System 22 allows a user to insert a financial term (which may be an entire financial section) into the mockup financial statement. System 22 maintains the integrity of the financial statement by automatically inserting calculated terms that are predecessors of the inserted term; the automatically inserted terms, however, are hidden in the mockup financial statement.

Figure 7:
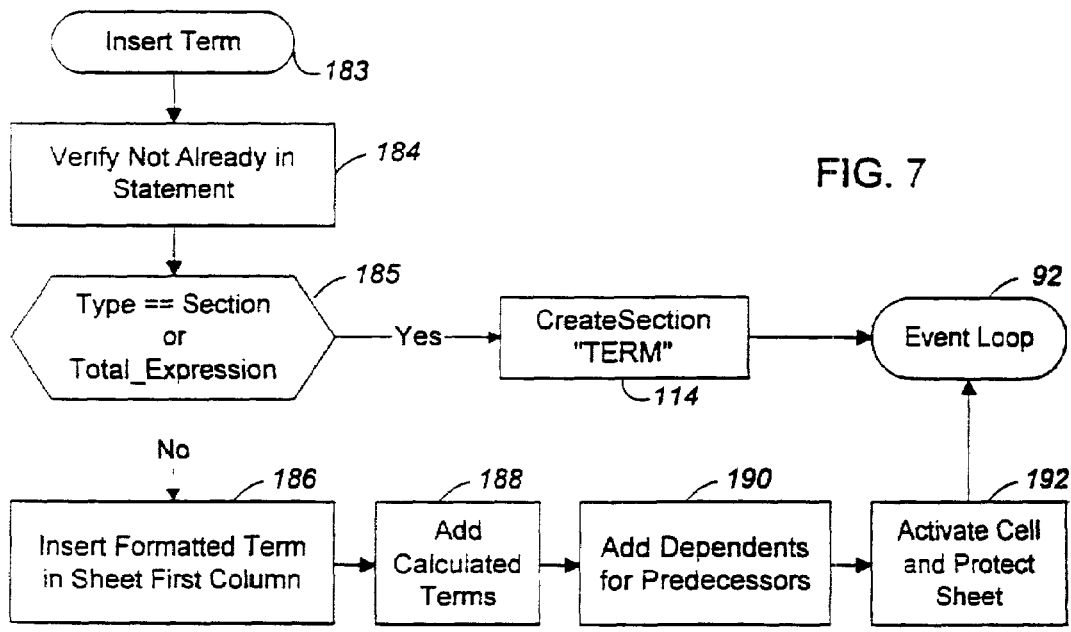
FIG. 7 is a flow diagram of a method of inserting a term into a financial statement.

Referring to FIG. 7, a financial term may be inserted into a mockup financial statement as follows (step 183). A user positions the cursor in an open cell of terms column 38 and activates INSERT TERM editing tool 170 from the financial statement editing tools menu. System 22 displays three-pane browser 111 (FIG. 3C) and the user uses it to select the term to be added (e.g., gross profit). System 22 verifies that the term is not already in the mockup statement (step 184). If the selected term is a section (e.g., costs) or a total expression as determined from the ISA relation for the term (step 185), system 22 creates a section for the term in accordance with the definition contained in financial knowledge base 23 (step 114; FIG. 5); otherwise, system 22 inserts the term (e.g., gross profit) in terms section 38 (step 186). System 22 automatically inserts into terms section 38 each of the calculated predecessor terms (e.g., net sales and cost of sales) that appears in the spreadsheet formula associated with the added term, if any (step 188). After the calculated terms are added, system 22 hides them so that they are not displayed on the mockup financial statement. System 22 also sets the DependentTo property of the predecessor terms (step 190). System 22 activates the cell containing the added term and protects the mockup financial statement (step 192). System 22 then returns control to the event loop and responds to subsequent user actions (step 92).

Alias. System 22 allows the user to change the name of a financial term appearing in the mockup financial statement, while maintaining the original meaning of the term as specified in financial statement editor 24.

Referring to FIG. 8, an alias for a term may be created as follows (step 200). A user positions a cursor in the cell of the term to receive the alias and selects ALIAS editing tool 171 from the editing tools menu. System 22 highlights the term name and allows the user to replace the term name with an alias (step 204). The user may alternatively type over the displayed name. System 22 records the alias in the alias property section of the associated finRow object (step 206). When the user updates the mockup financial statement, system 22 displays the user-defined alias wherever the original term appears in the mockup financial statement, including the input statement and the formulas in which the term is a direct predecessor, but not in financial knowledge base 23 in three-pane browser 111 (FIG. 3C). System 22 then returns control to the event loop and responds to subsequent user actions (step 92).

Duplicate. System 22 allows the user to create and rename multiple copies of an input term so that multiple inputs that should be summed together in one or more spreadsheet formulas can be separately displayed in the mockup financial statement. System 22 maintains the integrity of the financial statement by summing the copied terms in the spreadsheet formulas that are dependents of the term that was originally duplicated.

Referring to FIG. 9, a user can break up an input term into two separate input terms by duplicating the row containing the term. For example, a user can break up Returns term 132 into "European Returns" and "U.S. Returns" by positioning the cursor in a cell containing the Returns term and selecting DUPLICATE editing tool 172 (step 210). If the term to be duplicated is not an input term (default input or user-defined input) (step 212), system 22 returns control to the event loop and responds to subsequent user actions (step 92)—i.e., system 22 does not allow a user to duplicate a calculated term, an itemized term or an itemization. If the term is an input term and the term is not a duplicate of a another term (step 214), system 22 inserts into the mockup financial statement a row with a label built from the duplicated term and a unique identifier suffix (e.g., "Returns1") and creates a corresponding finRow object pointing back to the original source term (e.g., the DuplicateOf property is set to Returns) (step 216). System 22 also allows the user to set an alias for the inserted term (e.g., to change "Returns1" to "European Returns") (step 216). If the user selects for duplication an already duplicated term (e.g., Returns1), system 22 looks up the source term (e.g., Returns) (step 218) and duplicates the source term (step 216). After a duplicate term has been created, system 22 returns control to the event loop and responds to subsequent user actions (step 92).

If an input term is duplicated on one statement, wherever that term is referenced in formulas on other statements, the sum of the duplicates (e.g., Returns+Returns1) is used. The references in the other statements become secondary references by virtue of the duplication in the one statement. Thus, a duplicated input term is treated on other statements exactly as it is treated on the statement in which it is duplicated. System 22 does not allow a user to duplicate a secondary reference.

Itemize. System 22 allows the user to define a term as a sum of one or more user-defined inputs by itemizing the term. A term that is itemized will be referred to as an "itemized term" and the one or more user-defined inputs that are summed to obtain the value of the itemized term will be referred to as "itemizations."

Figure 10:
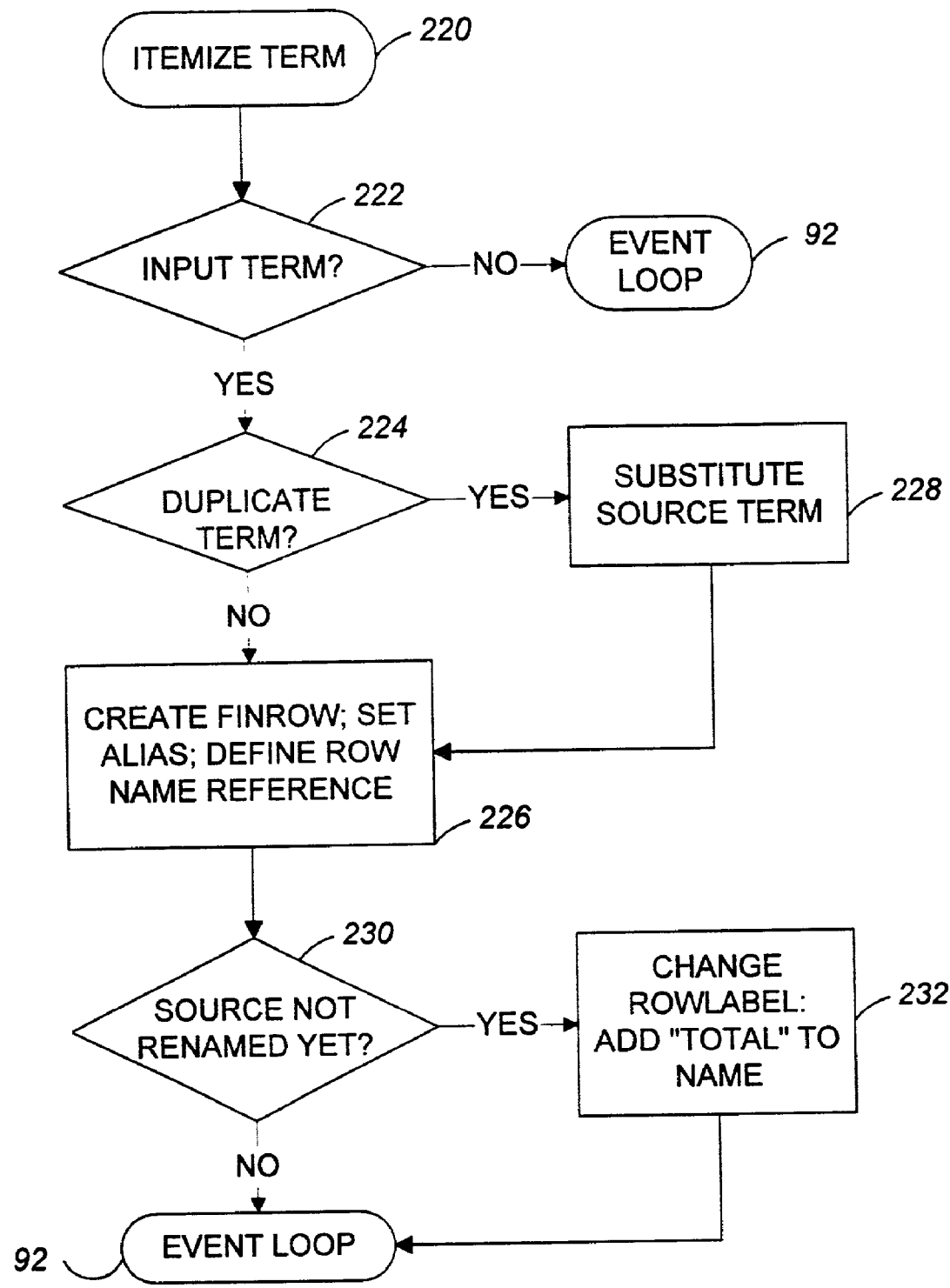
FIG. 10 is a flow diagram of a method of itemizing a row in a financial statement.

Referring to FIG. 10, a user can itemize an input term to create a total term (e.g., TotalReturns) which represents the sum of two or more user-defined input terms (e.g., European Returns+U.S. Returns) by selecting ITEMIZE editing tool 173 from the financial statement editing tools menu when the cursor is positioned on the term to be itemized (e.g., Returns) (step 220). If the term to be itemized is not an input term (default input or user-defined input) (step 222), system 22 returns control to the event loop and responds to subsequent user actions (step 92)—i.e., system 22 does not allow a user to itemize a calculated term or a duplicated term. If the term is an input and the term is not an itemization of another term (step 224), system 22 inserts into the mockup financial statement a row with the same label as the itemized term with a unique identifier attached (e.g., "Returns1") and creates a corresponding finRow object pointing back to the original source term (i.e., the ItemizationOf property is set to "Returns") (step 226). System 22 also allows the user to set an alias of the itemized term (e.g., to change "Returns1" to "European Returns") (step 226). If the user itemizes an itemized term (e.g., Returns1), system 22 looks up the source term (step 228) and itemizes the source term (step 226). If the source term (e.g., Returns) has not been renamed (step 230), system 22 changes the term's label by prepending the word "Total" to the original label (e.g., to yield "TotalReturns") (step 232). System 22 then returns control to the event loop and responds to subsequent user actions (step 92).

If an input term (e.g., Returns) is itemized on one financial statement in a project workbook, the total term (e.g., TotalReturns) is referenced wherever the original term (e.g., Returns) is referenced on other financial statements (either as an inserted term or in a formula) in the workbook. Thus, an itemized term is treated on other financial statements exactly as it is treated on the statement in which it is itemized. System 22 does not allow the user to itemize a secondary reference. If an input term that is already duplicated or itemized on one financial statement is inserted into another financial statement, the new insertion is defined as a secondary reference in the associated finRow object and cannot itself be itemized. The original itemization on the one financial statement is defined as a primary reference and its clones on the other financial statements are secondary references to the itemization. If a calculated term on one financial statement is required by a formula on another financial statement, then a reference is made from the second financial statement to the first financial statement (i.e., the original term does not have to be copied into the second financial statement).

Figure 11:
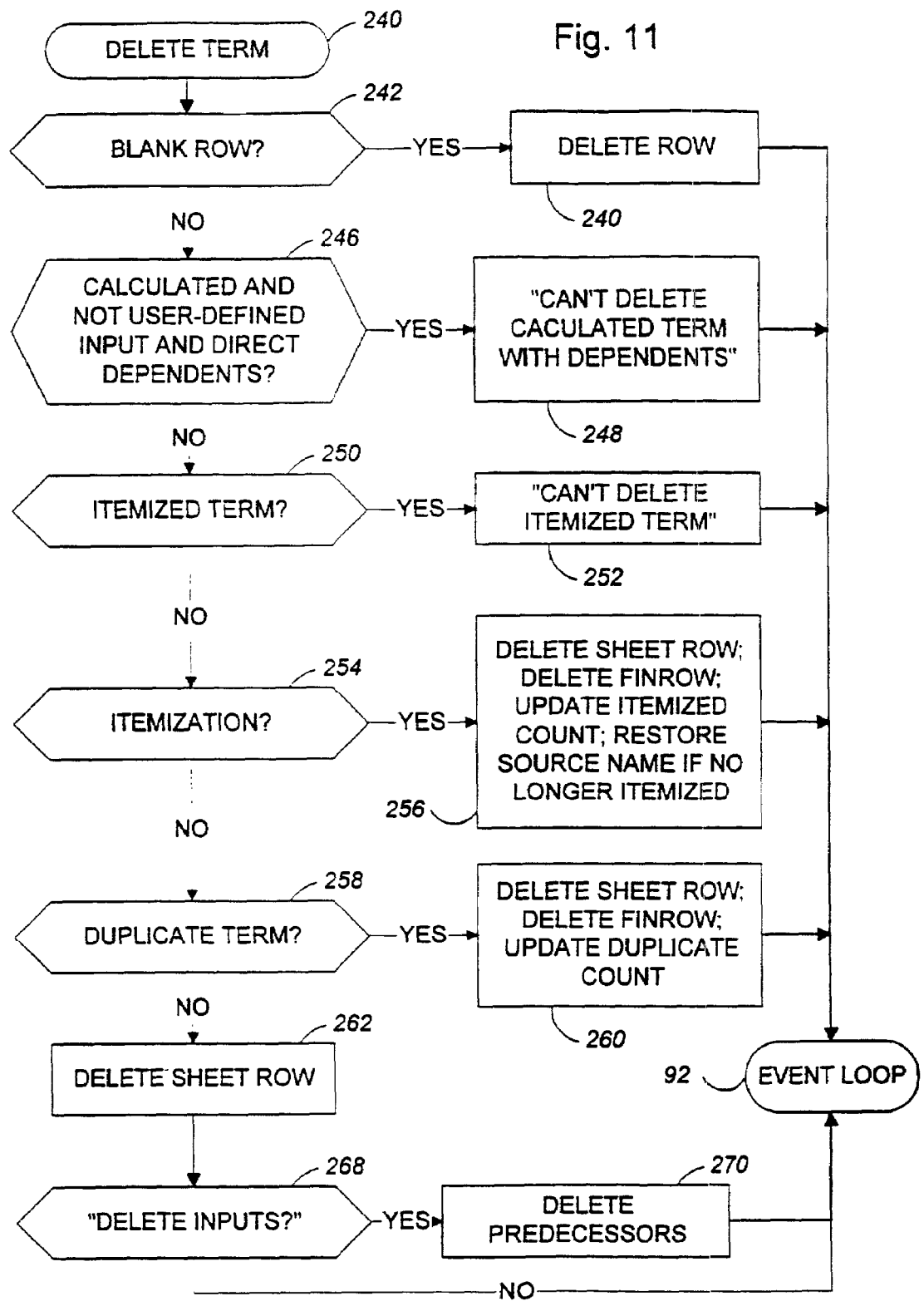
FIG. 11 is a flow diagram of a method of deleting a row in a financial statement.

Delete Term. Referring to FIG. 11, a user can delete a row so that a term does not appear in the mockup financial statement by selecting DELETE TERM editing tool 178 from the financial statement editing tools menu when the cursor is positioned on the row to be deleted (step 240). If the row is a blank row (step 242), system 22 simply deletes the row (step 244) and returns control to the event loop and responds to subsequent user actions (step 92). If the row contains a calculated term (e.g., gross profit term 136; FIG. 4) that is not defined to be an input term (i.e., the user did not convert a previously calculated term into an input term using CONVERT TO INPUT editing tool 174) and that has direct dependents (e.g., gross profit term 136: FIG. 4) (step 246), system 22 notifies the user that calculated terms with dependents cannot be deleted (step 248) and returns control to the event loop (step 92). If the row contains an itemized term (step 250), system 22 notifies the user that itemized terms cannot be deleted (step 252) and returns control to the event loop (step 92). If the row contains an itemization (step 254), system 22 deletes the row from the mockup financial statement, deletes the corresponding finRow from the finStatement object for the mockup financial statement, reduces by one the NumItemizations property of the source term, and restores the original source name if there are no itemizations for the term (e.g., changes "TotalReturns" to "Returns") (step 256). System 22 then returns control to the event loop and responds to subsequent user actions (step 92).

If the row to be deleted contains a duplicate term (step 258), system 22 deletes the row from the mockup financial statement, deletes the corresponding finRow from the finStatement object for the mockup financial statement, and reduces by one the NumDuplicates property of the source term (step 260). System 22 then returns control to the event loop and responds to subsequent user actions (step 92). If the row to be deleted contains an input term (default input or user-defined input) or a calculated term with no direct dependents (i.e., there is no other term in the mockup financial statement that depends on the term), system 22 deletes the row from the mockup financial statement (step 262). If the term is calculated from input terms, system 22 asks the user whether the input terms should also be deleted (step 268). If the user indicates that the input terms should be deleted, system 22 deletes each of the direct predecessors of the deleted calculated term (step 270). System 22 then returns control to the event loop and responds to subsequent user actions (step 92).

The deletion of an input term from one financial statement has no effect on the appearance of that term on other financial statements because deletion of a term from one statement indicates only that the term should not appear on that statement, not that the term is to be ignored in calculations. If the term to be deleted is a primary calculated term, system 22 converts one of the secondary references to be the primary term and all of the other references are modified to point to the converted term. Converting a calculated term to an input term and re-converting an input term back to a calculated does not affect references to the term on other financial statements because all references will still refer to the converted term and use its value. A term that is converted to input can only be hidden, not deleted.

Hide Terms. A user can hide a term appearing in the mockup financial statement by selecting HIDE TERM editing tool 169 when the cursor is positioned in the cell of the term to be hidden. If the cell does not contain a term, system 22 deletes the row containing the cell; otherwise, system 22 sets the Hidden property of the finRow object for the term to True. The row corresponding to this term is then not displayed on the mockup financial statement (or, later, on the completed financial statement report) because spreadsheet program 26 is configured to display only terms with Hidden property values set to False. Hidden terms cannot be duplicates or itemizations. The user may reveal a term by selecting an UNHIDE TERM editing tool, which directs system 22 to set the Hidden property of the finRow object to False.

A user can obtain a list of terms that are hidden in the mockup financial statement by selecting SHOW HIDDEN editing tool 177. System 22 responds by displaying a list of the names (aliases, if previously set) of the terms with Hidden properties set to True. If there are no hidden terms in the statement, system 22 displays the message, "There are no hidden items in this statement."

Convert to Input, Assume Zero, Convert to Calculated. A user can convert a calculated term into an input term by selecting CONVERT TO INPUT editing tool 174. A user may also convert a calculated term into an input term and have the tern's value set to zero when the financial statement is populated with values by selecting ASSUME ZERO editing tool 176. System 22 responds in either case by setting the UserDefinedInput finRow property for the term to True. A section header cannot be converted to an input. A Total term cannot be assumed to have a value of zero; the user must delete itemizations before the term can be assumed to be zero. A user can change a term from an assumed zero term to a regular input term by selecting CONVERT TO INPUT editing tool 174.

The user is given the option of recursively hiding the predecessors (former inputs) of a calculated term that is converted to input or assumed to be zero. If the term converted to input or assumed zero is the only dependent of a predecessor to be hidden, system 22 hides the predecessor and marks the DependentMadeInput and DependentMadeZero properties of the predecessor so that it does not appear in the input statement.

A user can reconvert a term converted to input or assumed to be zero back into a calculated term by selecting CONVERT TO CALCULATED editing tool 175. System 22 responds by setting the UserDefinedInput and AssumeZero finRow properties for the term to False. The user is given the option of displaying any hidden predecessors for the term converted back to calculated. In the case of an itemization, system 22 displays each of the itemizations and hides the Total term. In the case of an arbitrary dependent, system 22 recursively displays each of the predecessors and sets the DependentMadeInput and DependentAssumeZero finRow properties of the predecessors to False so that the input statement will contain the proper terms when updated. An itemization and a section header cannot be converted to be calculated terms.

Explain Term, Headings, Formatting Tools. A user can view the properties of a term by selecting the EXPLAIN TERM editing tool 181. System 22 responds by displaying the stored values for each of the finRow properties for the specified term, including the definition of the term contained in financial knowledge base 23 and any user-defined properties.

As mentioned above, by selecting HEADINGS editing tool 179, a user can toggle the display of the mockup financial statement formatted as specified in statement editor 24 or formatted with Excel grids and conventional alphanumeric headings for the matrix of rows and columns corresponding to the financial statement.

By selecting one or more FORMATTING TOOLS 180, a user may, for example, move a row up, move a row down, and change the appearance of text in the financial statement (e.g., bold, italic, underline, double underline, indent, shading such as gray shading or green shading). The following table summarizes some of the editing options available to a user.

| Editing Options | |
|---|---|
| User Action | System Response |
| Press Enter (or Return) key when cursor positioned on a blank row | Insert a new term |
| Type over term name | Create an alias |
| Press backspace key followed by Enter (or Return) key | Delete a term |
| Select search tool in financial knowledge base dialogue | Display an alphabetical list of all terms in the financial knowledge base |
| Select statement name then pull down menu INSERT/Rows | Add a blank row above the first term |
| Type over statement name (automatically changes statement tab) | Replace statement name |
| Use Excel's formatting tool bar (automatically displayed when a cell is selected in formattable areas) | Reformat statement name, period labels, data, and borders |
| Create a blank row before and after terms to be grouped, then type a section header name in the first blank row | Create a new section |
| Select the header for a section, then apply the Move Up or Move Down editing tool | Move an entire section |
| Select either an Itemization TOTAL or an existing item, then apply the Itemization editing tool | Create a new subitem |
| Apply the Show Hidden editing tool | Reveal hidden terms created when formulas are generated |
| Type a new number over a calculated value | Temporarily reveal the effect of changing a calculated value; the number will revert to its calculated value when user selects another cell |
| Enter values in the input spreadsheet (user-defined values appear in magenta there and in the mockup statement if they overwrite database values, in green if user supplies initial values, and in blue if values correspond to database values) | Enter or modify input values, propagate through formulas |
| Create a new statement or revise an existing full statement, then save the project | Create a statement template |
| Save a project before closing, then open the saved project | Re-edit a project during a later Excel session |
| To clone a term, insert term again on any spreadsheet | Create a secondary reference |

In addition, in an alternative implementation, financial statement editor 24 allows a user to type a new value over an input value in the mockup statement, which is treated as if the user had entered the value in the corresponding cell of the input statement.

Modify Periods and Change Database. System 22 changes the selected database 30 of the current project when the user selects the CHANGE DATABASE editing tool 189 from the financial statement editing tools (FIG. 6). As appropriate, system 22 updates the database and time style properties described above. In particular, the Exists database property is set to true if as a result of the change a database is linked to the current project, and to false otherwise; and the PeriodUnit database property is set to a string (such as "month", "quarter", or "year") identifying the period unit represented by columns of the selected database. System 22 does this by reading and interpreting the column labels of the selected database.

For databases that are Excel worksheets, the database time properties are detected automatically by comparing the first two column labels on the DATA sheet of the database. The labels are standard dates acceptable to Excel, with the addition of quarter data labels, which have four parts: first, one of Q, Qtr, or Quarter; second, a quarter number, 1, 2, 3, or 4; third, a space, and fourth, a two-digit or four-digit year.

Changing the selected database also causes system 22 to update values of finTime_Styles object properties as appropriate. In particular, the BasePeriodsAreTotals property is set to true if the mockup statement period unit is greater than database unit and therefore mockup statement base columns are totals of database columns, and to false otherwise. System 22 sets the property DBInconsistent to true or false according to whether the previous finTime_Styles style is inconsistent with newly selected database.

When a project is reloaded, system 22 determines whether the database linked to the project has changed. In one implementation, this is done simply by asking the user. If the database has changed, the input statement is recreated.

Changing the selected database causes system 22 to update and populate the mockup statement according to the newly set database and column properties, as will be described.

Through the MODIFY PERIODS editing tool 187, system 22 allows the user to specify the period unit of mockup statement base columns (which may be an integer multiple (one or greater) of the database period unit), and to include total columns in the mockup statement. Total columns may be subtotal or grand total columns. The period units may be selected from day, week, month, quarter, and year. A subtotal column sums preceding base columns, and a grand total column sums preceding subtotal columns.

Using the editing tools and user interface provided by system 22, the user can at any time define or redefine the start and end dates for the statement sequence of columns (periods), which will be called the base period duration. The base period duration and the period unit define a time period style, which therefore defines the period of time covered by the statement and the temporal granularity of the statement. If the base period duration is not co-extensive with the a subtotal or grand total period unit, system 22 alerts the user and offers to extend the end date to allow computing the total. System 22 also detects and adjusts for a start date which is not on a period boundary: for example, if the start date is November, then the first quarter ending December 31 st cannot be calculated and remains blank.

A formula can include the distinguished term "DaysInPeriod", for which will be substituted the number of days in the period for the column in which the formula appears. For example, if DaysInPeriod appears in a formula in a column whose period unit is Quarter, then the number 90 will be substituted.

In response to the user defining or redefining any of the time or time period parameters described above, system 22 sets the affected database, column, and time style properties, inserts total columns (or updates previously inserted total columns), and updates and populates the mockup statement accordingly. In particular, if the base period duration is changed, the input statement is recreated.

Data Import

System 22 optionally includes linking tools for importing data. For example, to facilitate use of data from Compustat financial databases (Standard & Poor's Compustat is a division of The McGraw-Hill Companies, Inc.), a workbook template is provided in which the row names are the names used in dictionary 23 and columns are formulas that are programmed to access data from Compustat databases. When the user enters Compustat as the database name in selecting database 30, system 22 opens an empty Compustat workbook and a Compustat database, typically on a CD-ROM. When the user has identified the company whose financial information is to be used, system 22 reads the data and populates a Compustat worksheet in the Compustat workbook to create an Excel database, in which the first column carries the term names and the first row, the data labels, both in the form expected by system 22 and dictionary 23. This Compustat worksheet is then used as the database source of input for the input statement.

To assist the user in handling the general case, system 22 optionally provides tools to create a linking worksheet that creates a level of indirection between the names used by the system and print, label, and code names that may be used by a database from which data is to be imported. The linking worksheet in effect maps terms from the input database to dictionary 23.

When a user requests system 22 to create a linking worksheet to an import database, system 22 opens the import database and, examining its first column, tries to match terms from the input database to those in dictionary 23. In column 1 of the linking worksheet, system 22 stores the terms from the import database. In the rows of column 2, system 22 stores the corresponding terms from dictionary 23. In the rows of column 3, system 22 stores a Boolean value set to true if the database row is a subitem of the matching term from dictionary 23, which information is received from the user. If this value is true, system 22 will itemize the corresponding row in the mockup statement and insert the import database term as a subitem in the row. In the rows of column 4 system 22 stores a Boolean value set to true if the import database term provides as data information that in dictionary 23 is calculated. If this value is true, system 22 will edit the term in the mockup statement at statement creation time to convert it to input. In the rows of column 5, system 22 stores a Boolean value set to true if the import database stores the term with a sign opposite to that expected by dictionary 23. If this value is true, system 22 will invert the imported data when populating the input statement.

System 22 cannot guarantee that the linking worksheet will be defined completely or correctly, so the user must check this worksheet and possibly complete it by hand. For example, the user will want to confirm that names in columns 1 and 2 are properly matched, and that the Boolean values in columns 3 through 5 are properly set. In addition, if the import database has a single term that corresponds to a sum of rows in dictionary 23, the user will have to handle this as a special case. This may require the user to define terms to disaggregate the input database total or to define terms that use the total provided by the input database.

Updating and Populating the Mockup Statement

System 22 automatically creates (or updates) the input statement when the user selects UPDATE editing tool 182 from the financial statement editing tools (FIG. 6), or selects the input statement tab located at the bottom of the project workbook window displayed on user interface 28. System 22 creates input statement 52 by collecting all of the inputs needed to populate the mockup statement with values. For example, as shown in FIG. 12, an input statement 300 created for income statement 44 (FIG. 4) contains all of the inputs needed to populate income statement 44 with values. The input terms are inserted into terms area 60 and the associated values (obtained from another spreadsheet, an external database, or direct user input) are located in inputs area 62 under time periods area 58.

System 22 first establishes an input statement, a spreadsheet named "INPUT", to which financial terms and values will be written. When the input statement is first created, the time range is displayed based upon the time style defined in the referenced financial statement. System 22 defines a parallel finStatement that contains pointers back to the INPUT spreadsheet and contains all of the information about these rows and columns of the INPUT spreadsheet. The INPUT spreadsheet is fully described by internal objects corresponding to the type data structure of a finStatement with its finRows, finColumns, and finCells. As explained below, once all of the inputs have been added to the INPUT spreadsheet, system 22 sets pointers from the mockup financial statement to the INPUT spreadsheet and sets the formulas for calculated terms.

Figure 13:
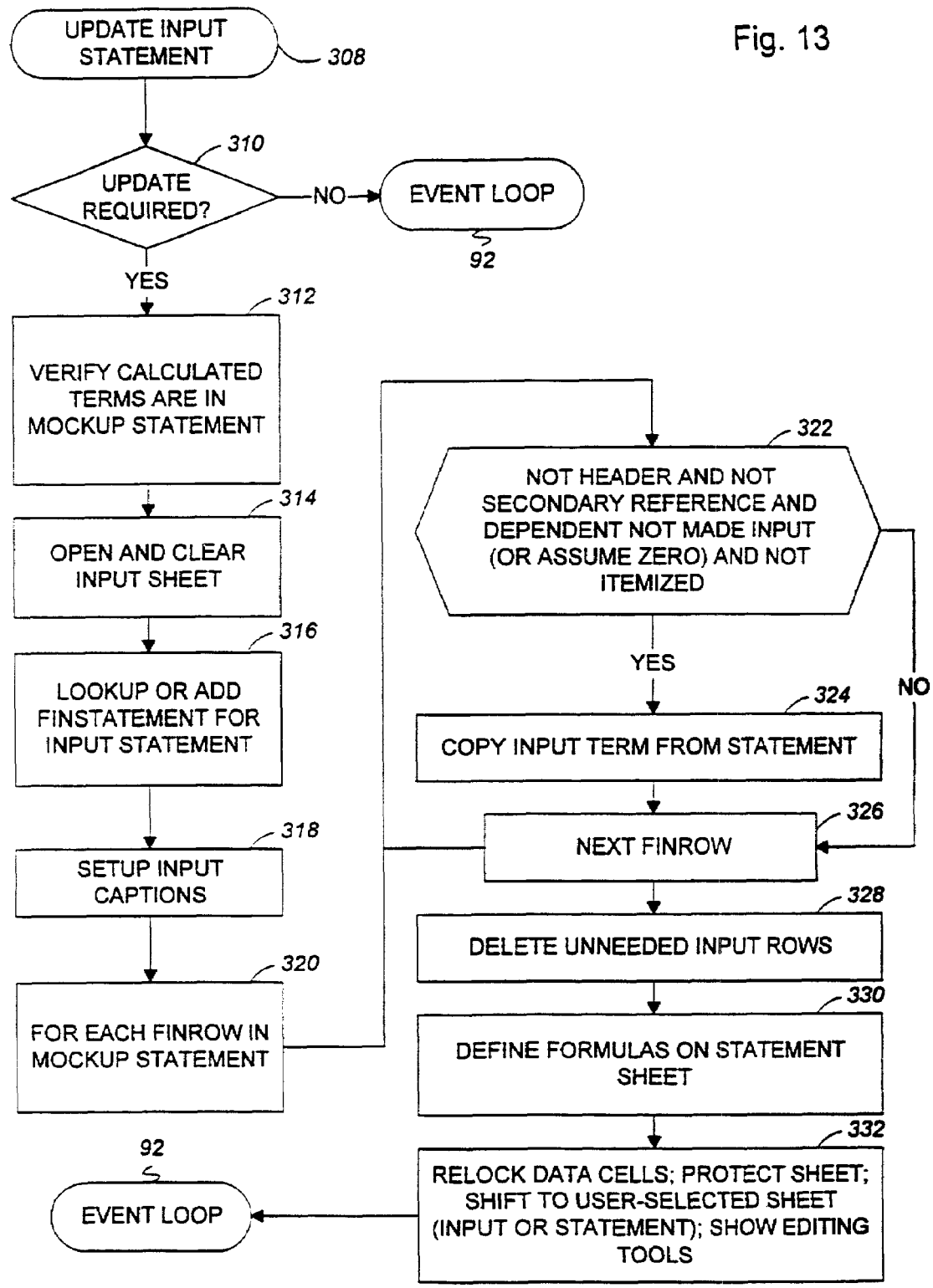
FIG. 13 is a flow diagram of a method of updating an input statement.
Figure 13A:
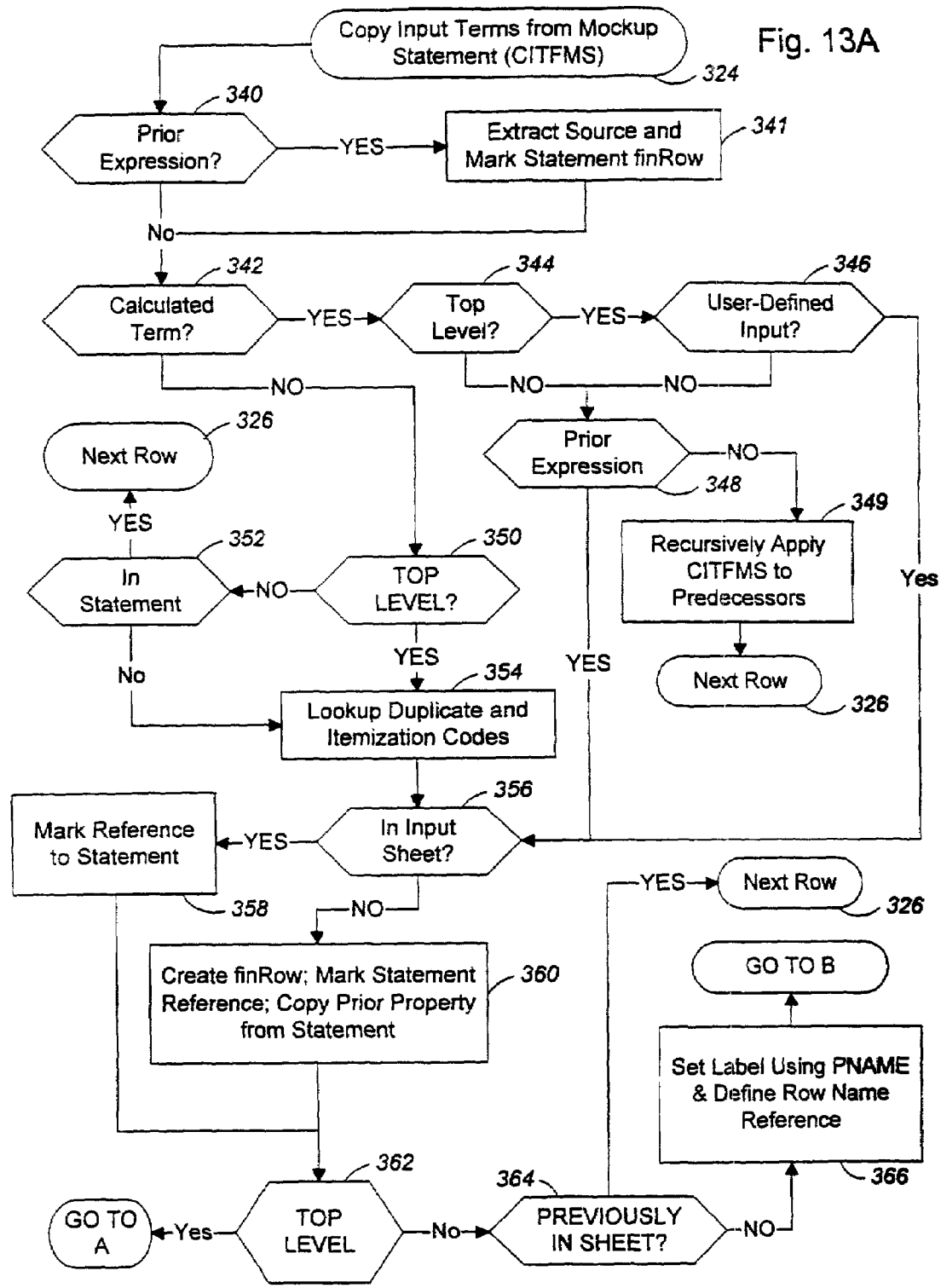

Referring to FIG. 13, a user may update the input statement by selecting UPDATE editing tool 182 (step 308). If there have not been any changes to the mockup financial statement that affect the input statement (step 310), system 22 returns control to the event loop and responds to subsequent user actions (step 92). System 22 verifies that there are calculated terms in the mockup financial statement (step 312). System 22 opens and clears the input statement (step 314). System 22 looks up or adds a finStatement object for the input statement (step 316). System 22 automatically inserts project name 54, input statement identifier 56, and time periods captions 58 into the input statement (step 318). For each finRow associated with the mockup financial statement, system 22 performs the following steps (step 320). If the term is not a header, not a secondary reference, not a term whose dependent was converted to an input or assumed to be zero, and not itemized (step 322), system 22 copies the input term from the mockup financial statement into the input statement (step 324; FIG. 13A). In effect, step 322 screens out headers and calculated terms that are not needed in the input statement. System 22 then repeats step 322 for the next finRow associated with the mockup financial statement (step 326). System 22 deletes terms that are not needed from the input statement (step 328). System 22 inserts formulas on the mockup financial statement (step 330; FIG. 13B). System 22 then relocks the data cells, protects the sheets, displays the statement selected by the user (input statement or mockup financial statement), and displays the financial statement editing tools menu (step 332). System 22 returns control to the event loop and responds to subsequent user actions (step 92).

Referring to FIG. 13A, in order to copy the required input terms from the mockup financial statement to the input statement, each finRow of the mockup financial statement is processed as follows (step 324). If the term depends upon a term from a different time period (a "prior expression") (step 340), system 22 extracts the source term and marks the PriorYrHistory property of the finRow object for the term (step 341). For example, the term change_in_deferred_taxes, which is part of cash flow statement 48 (FIG. 2A), is defined as deferred_taxes minus deferred_taxes_prior; the source term is deferred_taxes. If the term is a calculated term (step 342), and the term is not a top level term (i.e., the term appears in a spreadsheet formula) (step 344) or a user-defined input term (step 346) and the term is not a prior expression (step 348), system 22 parses the spreadsheet formula for the term and recursively returns to step 324 for each term in the spreadsheet formula (step 349). After each of the term's inputs has been copied into the input statement, the next finRow object is processed (step 326). If the term is not calculated (step 342) and is not a top level term (step 350), system 22 determines whether the term appears in the mockup financial statement (step 352). If the term appears in the mockup financial statement, system 22 processes the next finRow object (step 326). If the term does not appear in the mockup financial statement (step 352), or if the term is a top level term (i.e, a spreadsheet formula is not currently being analyzed) (step 350), system 22 determines the DuplicateCode and the ItemizationCode properties of the finRow object for the term (step 354); these properties are used for looking up the term in the input statement. If the term is in the input statement (step 356), system 22 marks a reference to the mockup financial statement and sets a "previously in sheet" property for the term (step 358). If the term is not in the input statement (step 356), system 22 creates a finRow object, marks a reference to the mockup financial statement, and copies the PriorHistory property of the term (step 360). If the term is not a top level term (step 362) and is a term that was just added to the input statement in step 360 (step 364), system 22 processes the next finRow object for the mockup financial statement (step 326); if the term was not just added to the input statement in step 360 (step 364), system 22 sets the label using the PNAME relation of the term and defines the row name reference for the term (step 366).

Referring to FIG. 13B, if the term is a top level term (step 362. FIG. 13A) and the source term appearing in the mockup financial statement is aliased (step 368), system 22 sets the alias property and label property in the finRow object for the term and defines the row name reference (step 370). If the term appearing in the mockup financial statement is not aliased (step 368), system 22 sets the label property in the finRow object for the term and defines the row name reference (step 372). System 22 sets the AssumeZero and UserDefinedInput properties and copies the UserDefinedInput, DuplicateCode, and ItemizationCode values in the finRow object for the term (step 374). System 22 sets the input values, including the values obtained from financial database 30 (FIG. 1) and the font color values described above (step 376). System 22 then processes the next finRow object for the mockup financial statement (step 326).

Figure 13C:
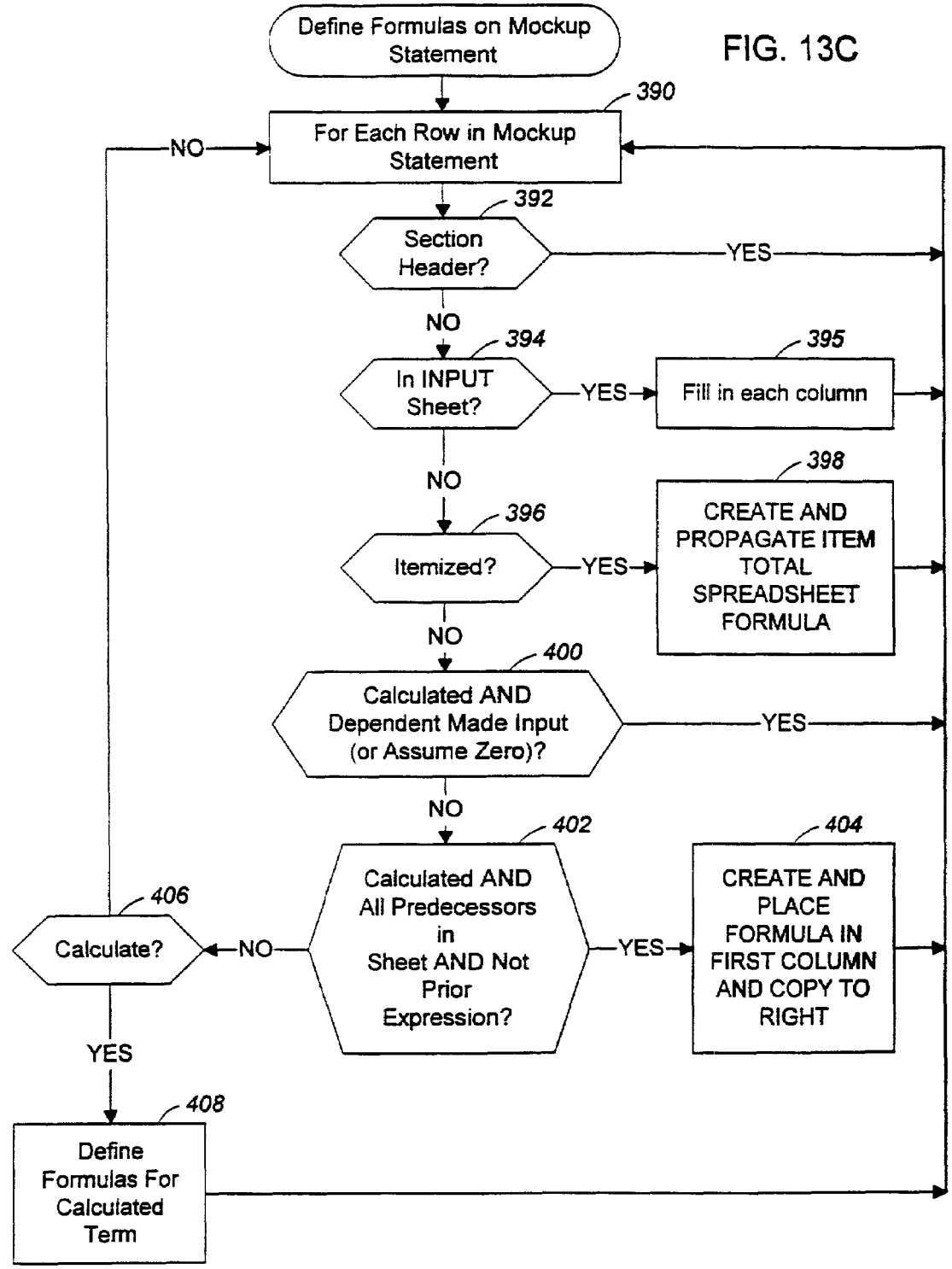
FIGS. 13C, 13D, and 13E are flow diagrams of a method of defining formulas on a financial statement.

Referring to FIG. 13C, system 22 inserts formulas into the mockup financial statement as follows (step 330; FIG. 13). For each row in the mockup financial statement, system 22 performs the following steps (step 390). If the row contains a section header term (step 392), system 22 proceeds to the next row (step 390). If the row contains a term that is in the input statement (step 394), system 22 creates a reference from each column in the mockup financial statement to the corresponding column in the input statement (step 395); system 22 then proceeds to the next row (step 390). If the row contains an itemized term (step 396), system 22 creates an item total spreadsheet formula, copies it into the first column cell of the row, and uses Excel to copy the appropriate formulas into the remaining columns of the mockup financial statement (step 398). If the row contains a calculated term and its dependents are assumed to be zero or its dependents have been converted to inputs (step 400), system 22 proceeds to the next row (step 390). If the row contains a calculated term and all of its predecessors appear in the mockup financial statement and none of the predecessors are prior expressions (step 402), system 22 creates the formula, copies it in the first column cell of the row, and uses Excel to copy the appropriate formulas into the remaining columns of the mockup financial statement (step 404). If the row does not contain a calculated term (step 406), system 22 proceeds to the next row in the mockup financial statement (step 390). If the row contains a calculated term (step 406), system 22 inserts formulas for the calculated term into each column of the mockup financial statement (step 408), then proceeds to the next row in the mockup financial statement (step 390).

Figure 13D:
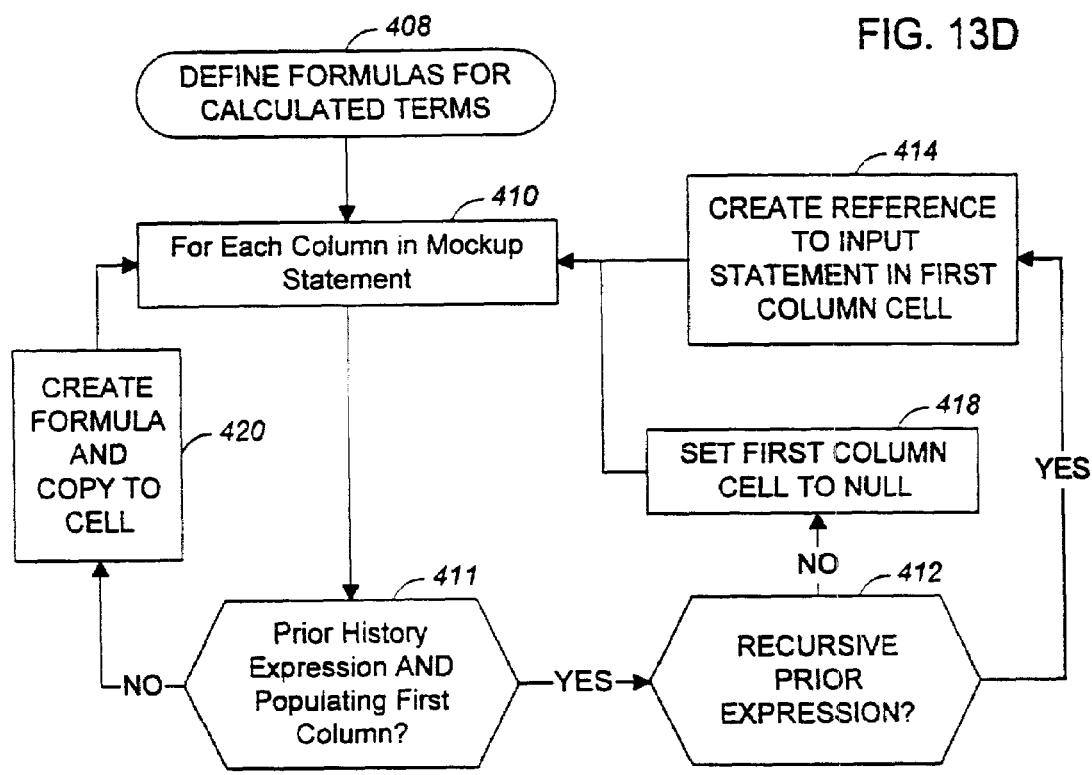

Referring to FIG. 13D, system 22 defines formulas for a calculated term appearing in a row of the mockup financial statement as follows (step 408). For each column in the mockup financial statement, system 22 performs the following steps (step 410). If the first column is being populated and the term's formula includes a recursive prior expression (e.g., x=f(x_prior)) (steps 411 and 412), system 22 creates a reference to the input statement in the first column cell (step 414); if the term's formula includes a prior expression that is not recursive (e.g., y=f(x_prior)), system 22 copies a null value into the first column cell (step 418). If the first column cell does not include a prior expression or the first column is not being populated (step 411), system 22 creates the formula for the term, as defined in financial knowledge base 23, and copies it into the cell (step 420). System 22 then proceeds to the next column in the mockup financial statement (step 410). System 22 creates names for the primitive terms in a formula defined in financial knowledge base 23 as follows. If the primitive term is in the mockup statement, its name or alias is used; otherwise, system 22 looks in other statements, avoiding secondary references (because they cannot be referenced by other sheets), and finally looks in the input statement. If the term is a prior term, the prior column for the current period is identified, and the Excel intersect operator is used to specify the cell for the term. If the term is a duplicate, a "+" is prepended to it, to which will be joined the other associated duplicate term(s). If the term was found in a different spreadsheet, the spreadsheet name is inserted to produce a formula of the form: <sheet name>!<row name><sheet name>!<column name>. (The space between >and <is the Excel intersect operator.) Thus, if a calculated term has inputs that do not appear in the mockup financial statement or has a formula with a prior expression, system 22 creates in the formula a reference to the statement and column of the cell containing the appropriate input value. System 22 does not insert into the input statement terms that are referenced as secondary references on any financial statements. In formula creation, system 22 creates references back to the primary reference.

Figure 13E:
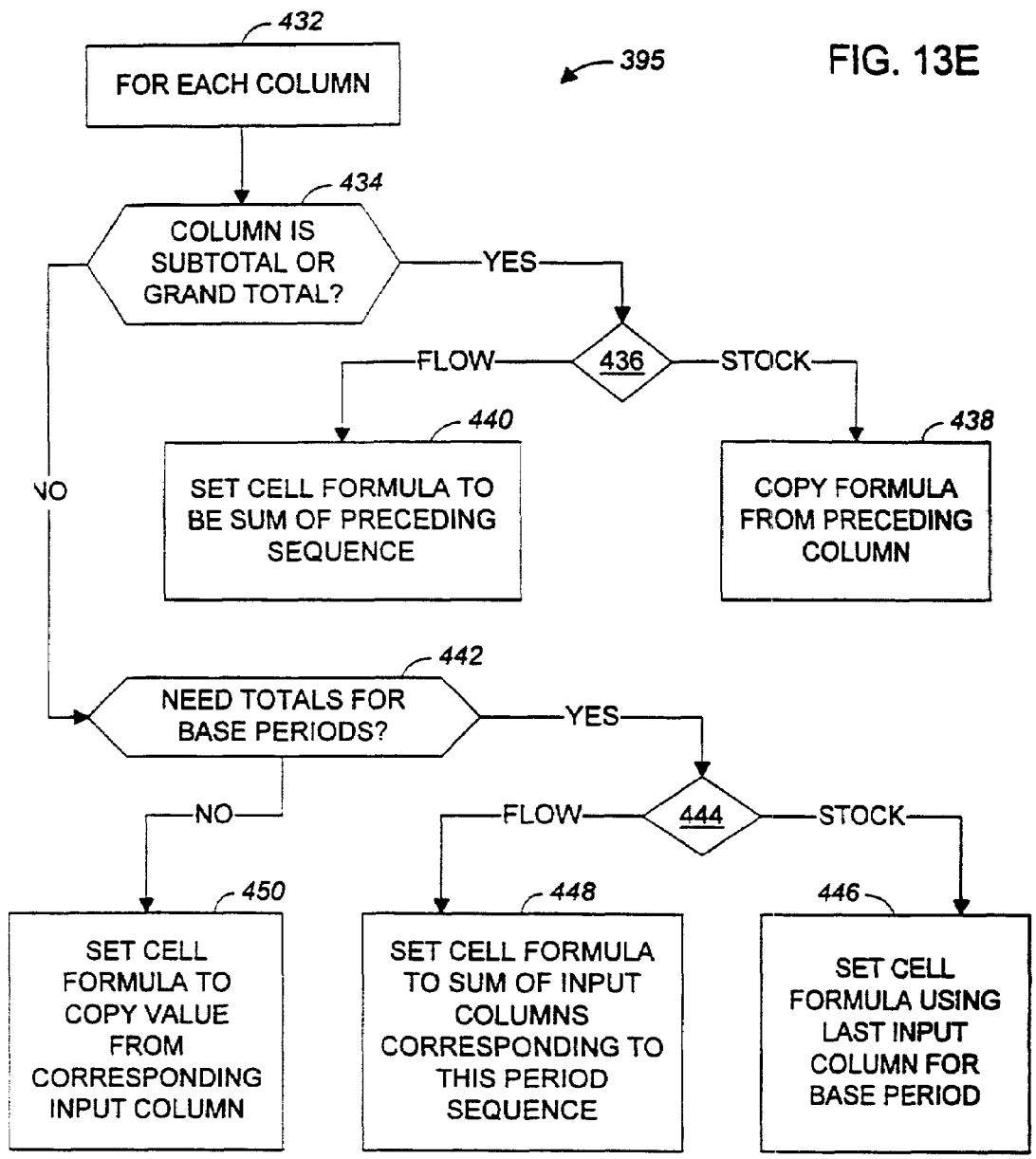

Referring to FIG. 13E, system 22 performs step 395 (FIG. 13C) as follows, for each column in the statement (step 432), in time sequence order from beginning with the earliest column. If the column is a subtotal or a grand total (decision step 434), then if the value in the underlying database is a stock (that is, cumulative and thus already a sum, such as accounts receivable) (decision step 436), system 22 copies the cell formula from the preceding column (step 438); otherwise, the underlying database value is a flow (that is, a value for a period, such as net sales), and system 22 sets the cell formula to calculate the sum of the appropriate preceding sequence of values (step 440).

In this step 440, a number of cases are handled. If the total is incomplete (for example, a first quarter total in a statement that begins in the second month of the quarter), the result is blank. If there is only one total column and it is the last column in the statement, the resulting formula is "=SUM (INPUT!X)", where X is the row on the INPUT sheet. This formula sums all the row X cells. If the column is a subtotal, the resulting formula is "=SUM((X<column_first>): (X<column_last>))". In this case, the columns are on the mockup statement and so no reference to the INPUT sheet is required. The formula uses the Excel intersect operator to identify the cell where row X intersects the first or the last column in the sequence to be summed. Finally, if the column is a grand total, system 22 works back from the immediately preceding column, which must be a subtotal, to create a formula that sums the subtotal columns in the grand total sequence, using the Excel "+" operator to create the sum. The columns in the sequence are found using the TotalStart-Column and TotalEndColumn properties of grand total and subtotal finColumn objects and the base and subtotal period units.

If the column is not a subtotal or grand total column and if the column needs totals for base periods ("yes" branch from decision step 442), then if the value is a stock (decision step 444), system 22 sets the cell formula using the column identified by the TotalEndColumn property, which is the last INPUT column in sequence for base period of the mockup statement (step 446); otherwise, the value is a flow and system 22 sets the cell formula to sum the INPUT columns corresponding to the period covered by the present statement column (step 448). If the column does not need totals for base periods ("no" branch of decision step 442), the column is a regular period unit and the cell formula is set to copy the value from the corresponding INPUT column (step 450). If subtotal or grand total columns intervene, the column number of the present statement column will differ from that of the corresponding INPUT column; system 22 keeps track of the correspondence so the columns can be mapped to each other.

Formula Generation Summarized

The following table and discussion summarize formula generation by system 22. Each cell in the table indicates how a formula for the indicated type of column is generated.

| Term X | Regular column (period unit same as database unit) | Base period total (smallest unit of statement > database unit) | Additional total (subtotal or grandtotal unit > smallest unit of statement) |
|---|---|---|---|
| Input Stock | Input!X | Last column of this database input sequence | Previous column in the statement |
| Input Flow | Input!X | Sum of inputs for this database sequence | Sum of columns of previous type |
| Calculated Stock | Formula as is | Formula as is; inputs must be in the sheet | Previous column, except "prior" refers to previous column of same period type |
| Calculated Flow | Formula as is | Formula as is; inputs must be in the sheet | Formula as is (sums up the column) |

A formula in the dictionary is a symbolic expression with only terms, e.g., Current_Liabilities=Notes_Payable+Accounts_Payable+Income_Taxes_Payable+Accrued_Expenses+Other_Current_Liabilities+Current_Portion_Of_Long_Term_Debt. Formula generation modifies such expressions to include sheet and column labels as necessary, but only as necessary, to make the formulas easier to read. Excel allows "English" labels to be used in formulas, but column lookup is not smart. For that reason, columns labels must be specified if the statements have different column labels (see discussion of INPUT!X, below). Also, the input sheet does not include total columns, therefore, there may not be a one-to-one correspondence between input and statement columns (which Excel requires for English formulas). For example, input columns may be Months, and the statement could include columns for Quarters and Years. Finally, formulas with "prior terms" require special treatment. A prior term always requires a column label qualification; although columns usually do not need to be specified.

In the preceding table, the notation "INPUT!X" indicates that for term X, the Excel formula is simply "=INPUT!X", i.e., the value in the statement cell is the value of the corresponding cell on the input sheet named INPUT (the INPUT row with label X and INPUT column with same label as the statement). Note that by default, Excel will match columns ordinally, that is, if INPUT!X appears in the third column of a statement, then Excel will use the value in row X and the third column of the INPUT sheet. Excel does not examine labels, but rather uses column order.

The designation "Stock" indicates that the value in the database is a stock value, meaning that it is cumulative (that is, already a sum), such as Accounts Receivable.

The designation "Flow" indicates that the value in the database is a flow value, meaning that it relates solely to the corresponding period, such as Net Sales.

The designation "Sum of inputs for this sequence" indicates an Excel formula that is the sum of the corresponding INPUT columns; for example, if a period is Qtr3, then the corresponding input sequence is July, August, September from the same year. The last column of this input sequence would be September.

The designation "Formula as is" indicates that the Excel formula is simply the symbolic formula using terms as they appear in the statement, without column labels, for example. "=Revenues−Expenses". In this situation, Excel automatically substitutes the values for the corresponding terms in the same column, for example, Profits Qtr3=Revenues Qtr3− Expenses Qtr3. The Qtr3 indicators need not be specified. By default Excel will treat all the terms in a formula as being rows in the statement in which the formula appears and by default will assume that all values come from the same column as the cell in which the formula appears. Note that a prior term (e.g., "Accounts_Receivable_prior") always requires a column label qualification, to refer to the previous column of the same period type.

The designation "inputs must be in the sheet" indicates that in certain cases, to make the formulas easier to generate and easier for the user to read, terms that are inputs (appearing in the INPUT sheet) are copied over to the statement that uses them. This makes it possible to use a formula as is, rather than substituting references to the INPUT sheet and its columns.

The designation "previous column in the statement" indicates the column immediately preceding this total column; for example, if a subtotal period unit is YEAR, then the previous column in the statement would be a base period column, which could be a day, week, month, or quarter, namely the last day, week, month, or quarter of that year.

The designation "sum of columns of the previous type" indicates that the formula for computing this total is generated by summing the columns of the next smaller period unit. For example, if the grandtotal type is YEAR and the subtotal type is MONTH, then the "previous type" is MONTH, and the total for the year will be the sum of the month columns. In practice, the "previous type" is the period type of the column immediately preceding this total column.

The designation "previous column" indicates a value that is the same as the value in the immediately preceding column; for example, if grandtotal type is YEAR and subtotal type is MONTH, then Accounts Receivable 1996=Accounts Receivable Dec96.

The designation "prior refers to previous column of the same period type" applies to a calculated stock; the prior reference in a total column refers to the value for the previous column of that total type, for example "prior" in a 1996 column refers to the value for 1995. For example, assuming grandtotal type is YEAR and subtotal type is MONTH, and having a dictionary formula "Sales Growth %"=(Net_Sales−Net_Sales_prior)/ Net_Sales_prior;

then the column formula would be

Sales Growth % 1996=(Net_Sales Dec96−Net_Sales 1995)/Net_Sales 1995.

Data Export

The financial knowledge base 23 includes two properties to facilitate data export, EXPORTKEY and EXPORT-PRINT. Both have values of type "string". These properties can be edited by a user through the user interface, or they can be defined in a predefined workbook. If the value of EXPORTKEY for a term is non-blank, the term's row will be added to an export file when the export file is created, by a user invoking an export command, for example. In the export file, the value of property EXPORTPRINT will be the print name of the term, replacing the contents of the first column of the mockup statement. Optionally, the value of EXPORTKEY can be a database code for use by a database system reading the export file, and in that case the code value can also be included with the row in the export file. Optionally, too, system 22 can include in the export file a header providing time style information. Using these features, a user of system 22 can easily export a statement created by the system for use by another application, and in particular by another financial analysis application, in a form that is easily imported by the other application.

Other Features

As mentioned above, overwriting a term name assigns an alias to a predefined term contained within financial knowledge base 23. A user may also extend the dictionary of financial terms in financial knowledge base 23 and give formula definitions to new terms by example. For example, a user-defined term and an associated formula may be inserted into a financial section of a mockup financial statement, and system 22 can be directed to add the user-defined formula to financial knowledge base 23. System 22 prompts the user to indicate whether the added term should be added to the dictionary section corresponding to the section in which the term appears in the mockup financial statement. If not, system 22 prompts the user to identify the section to which the term should be added or whether a new user-defined statement template should be created. A user can also override a predefined formula. The user is prompted to indicate whether the existing term is to be converted into a new term (i.e., the new term will be used only where the user references the term) or whether the built-in term is to be redefined. System 22 shows in blue user-defined terms and terms with redefined formulas. For example, if a user redefined the net revenue term, system 22 displays in blue all cells with values derived from built-in formulas that depend on net revenue.

The mockup financial statement shown in FIG. 2 displays financial information as a matrix of rows of financial terms and columns of time periods. Financial reports can be constructed in other ways. In one arrangement, a financial report presents financial information as a matrix of rows of contexts and columns of financial terms; this is useful when there is to be one report for each time period. For example, a financial report for a database of assets can show unit price, number of units, value, change, percentage ownership, and tax liability. In another arrangement, a financial report presents financial information as a matrix of rows of periods and columns of financial terms; this is useful when there is to be one report for each context. For example, a financial report for a projection of liabilities, such as a mortgage payment calculation, can show balance, payment, and interest per period for each of a number of properties.

In sum, a novel toolkit for creating and editing reports has been described. The toolkit includes a knowledge base with a dictionary of domain-specific terms, which can be selected by a user to create and edit a report. The toolkit can also assemble predefined reports that can be customized with one or more editing tools. The toolkit can be used to help frame formulate, and interpret an analysis for common business purposes. In the implementation described, the toolkit manages electronic spreadsheets using a knowledge base that represents how terms in domain-specific reports (i.e., financial statements) are related. This toolkit enhances an Excel spreadsheet by managing information and models and providing an interface between spreadsheets (cell and formulas) and databases (inputs). The toolkit provides a library of reusable components (objects) that contains definitions of numeric calculations in terms of business, organization, product, geographic, and time relations. The toolkit allows a user easily to create a standardized report based upon a predefined template or to create an arbitrary, syntactically and semantically correct report from the terms contained within the built-in dictionary, which may be customized with user synonyms. The toolkit also creates an input spreadsheet that can be used to link all non-calculated cells appearing in a report to a user-supplied database. The input spreadsheet readily allows a user to perform what-if analyses.

The present invention has been described in terms of specific embodiments. The invention, however, is not limited to these specific embodiments, and other embodiments are within the scope of the claims.

What is claimed is:

1. A computer-implemented method of populating a financial statement having columns and rows, comprising:
    identifying an input database having columns as a source of input data for the financial statement, where data in the columns corresponds to a database period unit of time;
    determining the database period unit of time;
    receiving a statement period unit of time for base columns of the financial statement, where the statement period unit is greater than the database period unit;
    comparing the statement period unit of time to the database period unit of time;
    dynamically computing for each base column of the financial statement a correspondence to more than one column of the input database based on the comparison; and
    populating cells of the base columns of the financial statement with cell formula expressions derived from the correspondence.

2. The method of claim 1, wherein the financial statement is displayed to a user and the user can change the statement period unit of time, the method further comprising:
    receiving a user input changing the statement period unit of time to a second statement period unit of time;
    comparing the second statement period unit of time to the database period unit of time;
    dynamically computing for each base column of the financial statement a second correspondence to more than one column of the input database based on the comparison; and
    repopulating the cells in the base columns of the financial statement in response to a change in the statement period unit of time with second cell formula expressions derived from the second correspondence.

3. The method of claim 1, wherein determining the database period unit of time comprises:
    automatically detecting the database period unit from column labels read from the input database.

4. The method of claim 1, wherein the financial statement is displayed to a user, further comprising:
    inserting subtotal columns in the financial statement in response to a user request;
    populating the statement including the subtotal columns with cell formula expressions for calculating cell values including values for the subtotal columns.

5. The method of claim 4, wherein:
    the cell formula expression for a cell in a row holding a flow term defines a sum of base column values and the cell formula expression for a cell in a row holding a stock term defines a copy of a preceding base column value.

6. The method of claim 4, further comprising:
    inserting a grand total column in the financial statement in response to a user request; and
    populating cells of the grand total column with cell formula expressions for calculating cell values, where for a row holding a flow term, a grand total column has a cell value defined as the sum of subtotal column values.

7. A computer program residing on a computer-readable medium for causing a processor executing the computer program to populate an electronic financial statement having columns and rows, the computer program comprising instructions to:
    identify an input database having columns as a source of input data for the financial statement, where data in the columns corresponds to a database period unit of time;
    determine the database period unit of time;
    receive a statement period unit of time for base columns of the financial statement, where the statement period unit is greater than the database period unit;
    compare the statement period unit of time to the database period unit of time;
    dynamically compute for each base column of the financial statement a correspondence to more than one column of the input database based on the comparison; and
    populate cells of the base columns of the financial statement with formula expressions derived from the correspondence.

8. The computer program of claim 7, the computer program further comprising instructions to:
    display the financial statement to a user;
    change the statement period unit in response to a user input to a second statement period unit of time;
    compare the second statement period unit of time to the database period unit of time;
    dynamically compute for each base column of the financial statement a second correspondence to more than one column of the input database based on the comparison; and repopulate the cells in the base columns of the financial statement in response to the change in the statement period unit of time with second formula expressions derived from the second correspondence.

9. The computer program of claim 7, wherein instructions to determine the database period unit of time comprise instructions to:

automatically detect the database period unit from column labels read from the input database.

10. The computer program of claim 7, the computer program further comprising instructions to:

display the financial statement to the user;

insert subtotal columns in the financial statement in response to a user request; and populate the financial statement including the subtotal columns with cell formula expressions for calculating cell values including values for the subtotal columns.

11. The computer program of claim 10, wherein the cell formula expression for a cell in a row holding a flow term defines a sum of base column values, and the cell formula expression for a cell in a row holding a stock term defines a copy of a preceding base column value.

12. The computer program of claim 10, further comprising instructions to:

insert a grand total column in the financial statement in response to a user request; and populate cells of the grand total column with cell formula expressions for calculating cell values, where for a row holding a flow term, a grand total column has a cell value defined as the sum of subtotal column values.

13. The method of claim 1, wherein determining the database period unit of time comprises:

reading a first database time period from a first column of the input database;

reading a second database time period from a second column of the input database;

calculating a difference between the first database time period and the second database time period; and determining the database time period unit of time based on the difference.

14. The method of claim 1, wherein determining the database period unit of time comprises receiving an input defining the database period unit of time.

15. The computer program of claim 7, wherein instructions to determine the database period unit of time comprise instructions to:

read a first database time period from a first column of the input database;

read a second database time period from a second column of the input database;

calculate a difference between the first database time period and the second database time period; and determine the database time period unit of time based on the difference.

16. The computer program of claim 7, wherein instructions to determine the database period unit of time comprise instructions to receive an input defining the database period unit of time.

* * * * *